(12) United States Patent
Noyes

(10) Patent No.: US 9,475,699 B2
(45) Date of Patent: Oct. 25, 2016

(54) METHODS FOR TREATING AN OFFGAS CONTAINING CARBON OXIDES

(71) Applicant: Seerstone LLC, Provo, UT (US)

(72) Inventor: Dallas B. Noyes, Provo, UT (US)

(73) Assignee: Seerstone LLC., Provo, UT (US)

( * ) Notice: Subject to any disclaimer, the term of this patent is extended or adjusted under 35 U.S.C. 154(b) by 0 days.

(21) Appl. No.: 14/389,720

(22) PCT Filed: Mar. 15, 2013

(86) PCT No.: PCT/US2013/000075
§ 371 (c)(1),
(2) Date: Sep. 30, 2014

(87) PCT Pub. No.: WO2013/158158
PCT Pub. Date: Oct. 24, 2013

(65) Prior Publication Data
US 2015/0059527 A1   Mar. 5, 2015

Related U.S. Application Data

(60) Provisional application No. 61/624,513, filed on Apr. 16, 2012.

(51) Int. Cl.
*C01B 31/02* (2006.01)
*B01J 23/745* (2006.01)
(Continued)

(52) U.S. Cl.
CPC .............. *C01B 31/02* (2013.01); *B01J 23/745* (2013.01); *B01J 37/16* (2013.01); *B01J 37/18* (2013.01);
(Continued)

(58) Field of Classification Search
CPC ......... C01B 31/02; C01B 31/04; D01F 9/12; B82Y 40/00; B01J 23/755; B82B 1/00; B82B 3/00
See application file for complete search history.

(56) References Cited

U.S. PATENT DOCUMENTS 1,478,730 A   12/1923   Brownlee
1,735,925 A   11/1929   Jaeger
(Continued)

FOREIGN PATENT DOCUMENTS

JP          339339 B2    10/2002
WO       2013090274      6/2013
(Continued)

OTHER PUBLICATIONS

Srivastava, A. K., et al. "Microstructural features and mechanical properties of carbon nanotubes reinforced aluminum-based metal matrix composites." Indian Journal of Engineering and Materials Sciences 15.3 (2008): 247-255.*

(Continued)

*Primary Examiner* — Richard M Rump
(74) *Attorney, Agent, or Firm* — TraskBritt, P.C.

(57) ABSTRACT

A method of treating an offgas includes purifying the offgas to remove particulate matter, water, undesirable gaseous components and inert gases to produce a dried carbon oxide gas feedstock, and converting at least a portion of carbon oxides in the dried carbon oxide gas feedstock into solid carbon. In other embodiments, a method includes passing a dried carbon oxide gas feedstock through a multi-stage catalytic converter. A first stage is configured to catalyze methane-reforming reactions to convert methane into carbon dioxide, carbon monoxide and hydrogen with residual methane. A second stage is configured to catalyze the Bosch reaction and convert carbon oxides and hydrogen to solid carbon and water.

12 Claims, 6 Drawing Sheets

(51) Int. Cl.
*B01J 37/16* (2006.01)
*B01J 37/18* (2006.01)
*B82Y 30/00* (2011.01)
*B82Y 40/00* (2011.01)
*C21C 7/00* (2006.01)
*C22B 9/10* (2006.01)
*C22B 21/06* (2006.01)

(52) U.S. Cl.
CPC ............... *B82Y 30/00* (2013.01); *B82Y 40/00* (2013.01); *C01B 31/0226* (2013.01); *C01B 31/0233* (2013.01); *C21C 7/0025* (2013.01); *C22B 9/103* (2013.01); *C22B 21/06* (2013.01); *C21C 2100/02* (2013.01)

(56) References Cited

U.S. PATENT DOCUMENTS

| | | |
|---|---|---|
| 1,746,464 A | 2/1930 | Franz et al. |
| 1,964,744 A | 7/1934 | Odell |
| 2,404,869 A | 7/1946 | Sorrentino |
| 2,429,980 A | 11/1947 | Allinson |
| 2,440,424 A | 4/1948 | Wiegand et al. |
| 2,745,973 A | 5/1956 | Rappaport |
| 2,796,331 A | 6/1957 | Kauffman et al. |
| 2,800,616 A | 7/1957 | Becker |
| 2,811,653 A | 10/1957 | Moore |
| 2,819,414 A | 1/1958 | Sherwood et al. |
| 2,837,666 A | 6/1958 | Linder |
| 2,976,433 A | 3/1961 | Rappaport et al. |
| 3,094,634 A | 6/1963 | Rappaport |
| 3,172,774 A | 3/1965 | Diefendorf |
| 3,249,830 A | 5/1966 | Adany |
| 3,378,345 A | 4/1968 | Bourdeau |
| 3,634,999 A | 1/1972 | Howard et al. |
| 3,714,474 A | 1/1973 | Hoff |
| 3,846,478 A | 11/1974 | Cummins |
| 3,905,748 A | 9/1975 | Cairo et al. |
| 4,024,420 A | 5/1977 | Anthony et al. |
| 4,126,000 A | 11/1978 | Funk |
| 4,197,281 A | 4/1980 | Muenger |
| 4,200,554 A | 4/1980 | Lauder |
| 4,602,477 A | 7/1986 | Lucadamo et al. |
| 4,628,143 A | 12/1986 | Brotz |
| 4,663,230 A | 5/1987 | Tennent |
| 4,710,483 A | 12/1987 | Burk et al. |
| 4,725,346 A | 2/1988 | Joshi |
| 4,727,207 A | 2/1988 | Paparizos et al. |
| 4,746,458 A | 5/1988 | Brotz |
| 4,900,368 A | 2/1990 | Brotz |
| 5,008,579 A | 4/1991 | Conley et al. |
| 5,021,139 A | 6/1991 | Hartig et al. |
| 5,082,505 A | 1/1992 | Cota et al. |
| 5,122,332 A | 6/1992 | Russell |
| 5,133,190 A | 7/1992 | Abdelmalek |
| 5,149,584 A | 9/1992 | Baker et al. |
| 5,187,030 A | 2/1993 | Firmin et al. |
| 5,260,621 A | 11/1993 | Little et al. |
| 5,396,141 A | 3/1995 | Jantz |
| 5,413,866 A | 5/1995 | Baker et al. |
| 5,456,897 A | 10/1995 | Moy et al. |
| 5,526,374 A | 6/1996 | Uebber |
| 5,531,424 A | 7/1996 | Whipp |
| 5,569,635 A | 10/1996 | Moy et al. |
| 5,572,544 A | 11/1996 | Mathur et al. |
| 5,578,543 A | 11/1996 | Tennent et al. |
| 5,589,152 A | 12/1996 | Tennent et al. |
| 5,624,542 A | 4/1997 | Shen et al. |
| 5,641,466 A | 6/1997 | Ebbesen et al. |
| 5,648,056 A | 7/1997 | Tanaka |
| 5,650,370 A | 7/1997 | Tennent et al. |
| 5,691,054 A | 11/1997 | Tennent et al. |
| 5,707,916 A | 1/1998 | Snyder et al. |
| 5,726,116 A | 3/1998 | Moy et al. |
| 5,747,161 A | 5/1998 | Iijima |
| 5,780,101 A | 7/1998 | Nolan et al. |
| 5,859,484 A | 1/1999 | Mannik et al. |
| 5,877,110 A | 3/1999 | Snyder et al. |
| 5,910,238 A | 6/1999 | Cable et al. |
| 5,965,267 A | 10/1999 | Nolan et al. |
| 5,997,832 A | 12/1999 | Lieber et al. |
| 6,099,965 A | 8/2000 | Tennent et al. |
| 6,159,892 A | 12/2000 | Moy et al. |
| 6,183,714 B1 | 2/2001 | Smalley et al. |
| 6,203,814 B1 | 3/2001 | Fisher et al. |
| 6,221,330 B1 | 4/2001 | Moy et al. |
| 6,232,706 B1 | 5/2001 | Dai et al. |
| 6,239,057 B1 | 5/2001 | Ichikawa et al. |
| 6,261,532 B1 | 7/2001 | Ono |
| 6,262,129 B1 | 7/2001 | Murray et al. |
| 6,294,144 B1 | 9/2001 | Moy et al. |
| 6,333,016 B1 | 12/2001 | Resasco et al. |
| 6,346,189 B1 | 2/2002 | Dai et al. |
| 6,361,861 B2 | 3/2002 | Gao et al. |
| 6,375,917 B1 | 4/2002 | Mandeville et al. |
| 6,413,487 B1 | 7/2002 | Resasco et al. |
| 6,423,288 B2 | 7/2002 | Mandeville et al. |
| 6,426,442 B1 | 7/2002 | Ichikawa et al. |
| 6,465,813 B2 | 10/2002 | Ihm |
| 6,518,218 B1 | 2/2003 | Sun et al. |
| 6,596,101 B2 | 7/2003 | Weihs et al. |
| 6,645,455 B2 | 11/2003 | Margrave et al. |
| 6,683,783 B1 | 1/2004 | Smalley et al. |
| 6,686,311 B2 | 2/2004 | Sun et al. |
| 6,692,717 B1 | 2/2004 | Smalley et al. |
| 6,713,519 B2 | 3/2004 | Wang et al. |
| 6,749,827 B2 | 6/2004 | Smalley et al. |
| 6,761,870 B1 | 7/2004 | Smalley et al. |
| 6,790,425 B1 | 9/2004 | Smalley et al. |
| 6,800,369 B2 | 10/2004 | Gimzewski et al. |
| 6,827,918 B2 | 12/2004 | Margrave et al. |
| 6,827,919 B1 | 12/2004 | Moy et al. |
| 6,835,330 B2 | 12/2004 | Nishino et al. |
| 6,835,366 B1 | 12/2004 | Margrave et al. |
| 6,841,139 B2 | 1/2005 | Margrave et al. |
| 6,843,843 B2 | 1/2005 | Takahashi et al. |
| 6,855,301 B1 | 2/2005 | Rich et al. |
| 6,855,593 B2 | 2/2005 | Andoh |
| 6,875,412 B2 | 4/2005 | Margrave et al. |
| 6,890,986 B2 | 5/2005 | Pruett |
| 6,899,945 B2 | 5/2005 | Smalley et al. |
| 6,905,544 B2 | 6/2005 | Setoguchi et al. |
| 6,913,740 B2 | 7/2005 | Polverejan et al. |
| 6,913,789 B2 | 7/2005 | Smalley et al. |
| 6,916,434 B2 | 7/2005 | Nishino et al. |
| 6,919,064 B2 | 7/2005 | Resasco et al. |
| 6,936,233 B2 | 8/2005 | Smalley et al. |
| 6,949,237 B2 | 9/2005 | Smalley et al. |
| 6,955,800 B2 | 10/2005 | Resasco et al. |
| 6,960,389 B2 | 11/2005 | Tennent et al. |
| 6,962,685 B2 | 11/2005 | Sun |
| 6,979,709 B2 | 12/2005 | Smalley et al. |
| 6,986,876 B2 | 1/2006 | Smalley et al. |
| 6,998,358 B2 | 2/2006 | French et al. |
| 7,011,771 B2 | 3/2006 | Gao et al. |
| 7,041,620 B2 | 5/2006 | Smalley et al. |
| 7,045,108 B2 | 5/2006 | Jiang et al. |
| 7,048,999 B2 | 5/2006 | Smalley et al. |
| 7,052,668 B2 | 5/2006 | Smalley et al. |
| 7,067,098 B2 | 6/2006 | Colbert et al. |
| 7,071,406 B2 | 7/2006 | Smalley et al. |
| 7,074,379 B2 | 7/2006 | Moy et al. |
| 7,094,385 B2 | 8/2006 | Beguin et al. |
| 7,094,386 B2 | 8/2006 | Resasco et al. |
| 7,094,679 B1 | 8/2006 | Li et al. |
| 7,097,820 B2 | 8/2006 | Colbert et al. |
| 7,105,596 B2 | 9/2006 | Smalley et al. |
| 7,125,534 B1 | 10/2006 | Smalley et al. |
| 7,132,062 B1 | 11/2006 | Howard |
| 7,135,159 B2 | 11/2006 | Shaffer et al. |
| 7,135,160 B2 | 11/2006 | Yang et al. |
| 7,150,864 B1 | 12/2006 | Smalley et al. |
| 7,157,068 B2 | 1/2007 | Li et al. |
| 7,160,532 B2 | 1/2007 | Liu et al. |

(56) References Cited

U.S. PATENT DOCUMENTS

| | | |
|---|---|---|
| 7,169,329 B2 | 1/2007 | Wong et al. |
| 7,201,887 B2 | 4/2007 | Smalley et al. |
| 7,204,970 B2 | 4/2007 | Smalley et al. |
| 7,205,069 B2 | 4/2007 | Smalley et al. |
| 7,212,147 B2 | 5/2007 | Messano |
| 7,214,360 B2 | 5/2007 | Chen et al. |
| 7,250,148 B2 | 7/2007 | Yang et al. |
| 7,270,795 B2 | 9/2007 | Kawakami et al. |
| 7,291,318 B2 | 11/2007 | Sakurabayashi et al. |
| 7,338,648 B2 | 3/2008 | Harutyunyan et al. |
| 7,365,289 B2 | 4/2008 | Wilkes et al. |
| 7,374,793 B2 | 5/2008 | Furukawa et al. |
| 7,390,477 B2 | 6/2008 | Smalley et al. |
| 7,396,798 B2 | 7/2008 | Ma et al. |
| 7,408,186 B2 | 8/2008 | Merkulov et al. |
| 7,410,628 B2 | 8/2008 | Bening et al. |
| 7,413,723 B2 | 8/2008 | Niu et al. |
| 7,452,828 B2 | 11/2008 | Hirakata et al. |
| 7,459,137 B2 | 12/2008 | Tour et al. |
| 7,459,138 B2 | 12/2008 | Resasco et al. |
| 7,473,873 B2 | 1/2009 | Biris et al. |
| 7,510,695 B2 | 3/2009 | Smalley et al. |
| 7,527,780 B2 | 5/2009 | Margrave et al. |
| 7,563,427 B2 | 7/2009 | Wei et al. |
| 7,563,428 B2 | 7/2009 | Resasco et al. |
| 7,569,203 B2 | 8/2009 | Fridman et al. |
| 7,572,426 B2 | 8/2009 | Strano et al. |
| 7,585,483 B2 | 9/2009 | Edwin et al. |
| 7,601,322 B2 | 10/2009 | Huang |
| 7,611,579 B2 | 11/2009 | Lashmore et al. |
| 7,615,204 B2 | 11/2009 | Ajayan et al. |
| 7,618,599 B2 | 11/2009 | Kim et al. |
| 7,622,059 B2 | 11/2009 | Bordere et al. |
| 7,632,569 B2 | 12/2009 | Smalley et al. |
| 7,645,933 B2 | 1/2010 | Narkis et al. |
| 7,655,302 B2 | 2/2010 | Smalley et al. |
| 7,670,510 B2 | 3/2010 | Wong et al. |
| 7,700,065 B2 | 4/2010 | Fujioka et al. |
| 7,704,481 B2 | 4/2010 | Higashi et al. |
| 7,718,283 B2 | 5/2010 | Raffaelle et al. |
| 7,719,265 B2 | 5/2010 | Harutyunyan et al. |
| 7,731,930 B2 | 6/2010 | Taki et al. |
| 7,736,741 B2 | 6/2010 | Maruyama et al. |
| 7,740,825 B2 | 6/2010 | Tohji et al. |
| 7,749,477 B2 | 7/2010 | Jiang et al. |
| 7,754,182 B2 | 7/2010 | Jiang et al. |
| 7,772,447 B2 | 8/2010 | Iaccino et al. |
| 7,780,939 B2 | 8/2010 | Margrave et al. |
| 7,785,558 B2 | 8/2010 | Hikata |
| 7,790,228 B2 | 9/2010 | Suekane et al. |
| 7,794,690 B2 | 9/2010 | Abatzoglou et al. |
| 7,794,797 B2 | 9/2010 | Vasenkov |
| 7,799,246 B2 | 9/2010 | Bordere et al. |
| 7,811,542 B1 | 10/2010 | McElrath et al. |
| 7,824,648 B2 | 11/2010 | Jiang et al. |
| 7,837,968 B2 | 11/2010 | Chang et al. |
| 7,838,843 B2 | 11/2010 | Kawakami et al. |
| 7,842,271 B2 | 11/2010 | Petrik |
| 7,854,945 B2 | 12/2010 | Fischer et al. |
| 7,854,991 B2 | 12/2010 | Hata et al. |
| 7,858,648 B2 | 12/2010 | Bianco et al. |
| 7,871,591 B2 | 1/2011 | Harutyunyan et al. |
| 7,883,995 B2 | 2/2011 | Mitchell et al. |
| 7,887,774 B2 | 2/2011 | Strano et al. |
| 7,888,543 B2 | 2/2011 | Iaccino et al. |
| 7,897,209 B2 | 3/2011 | Shibuya et al. |
| 7,901,654 B2 | 3/2011 | Harutyunyan |
| 7,906,095 B2 | 3/2011 | Kawabata |
| 7,919,065 B2 | 4/2011 | Pedersen et al. |
| 7,923,403 B2 | 4/2011 | Ma et al. |
| 7,923,615 B2 | 4/2011 | Silvy et al. |
| 7,932,419 B2 | 4/2011 | Liu et al. |
| 7,947,245 B2 | 5/2011 | Tada et al. |
| 7,951,351 B2 | 5/2011 | Ma et al. |
| 7,964,174 B2 | 6/2011 | Dubin et al. |
| 7,981,396 B2 | 7/2011 | Harutyunyan |
| 7,988,861 B2 | 8/2011 | Pham-Huu et al. |
| 7,993,594 B2 | 8/2011 | Wei et al. |
| 8,012,447 B2 | 9/2011 | Harutyunyan et al. |
| 8,017,282 B2 | 9/2011 | Choi et al. |
| 8,017,892 B2 | 9/2011 | Biris et al. |
| 8,038,908 B2 | 10/2011 | Hirai et al. |
| 8,114,518 B2 | 2/2012 | Hata et al. |
| 8,138,384 B2 | 3/2012 | Iaccino et al. |
| 8,173,096 B2 | 5/2012 | Chang et al. |
| 8,178,049 B2 | 5/2012 | Shiraki et al. |
| 8,226,902 B2 | 7/2012 | Jang et al. |
| 8,314,044 B2 | 11/2012 | Jangbarwala |
| 2001/0009119 A1 | 7/2001 | Murray et al. |
| 2002/0054849 A1 | 5/2002 | Baker et al. |
| 2002/0102193 A1 | 8/2002 | Smalley et al. |
| 2002/0102196 A1 | 8/2002 | Smalley et al. |
| 2002/0127169 A1 | 9/2002 | Smalley et al. |
| 2002/0127170 A1 | 9/2002 | Hong et al. |
| 2002/0172767 A1 | 11/2002 | Grigorian et al. |
| 2003/0059364 A1 | 3/2003 | Prilutskiy |
| 2003/0147802 A1 | 8/2003 | Smalley et al. |
| 2004/0053440 A1 | 3/2004 | Lai et al. |
| 2004/0070009 A1 | 4/2004 | Resasco et al. |
| 2004/0105807 A1 | 6/2004 | Fan et al. |
| 2004/0111968 A1 | 6/2004 | Day et al. |
| 2004/0151654 A1 | 8/2004 | Wei et al. |
| 2004/0194705 A1 | 10/2004 | Dai et al. |
| 2004/0197260 A1 | 10/2004 | Resasco et al. |
| 2004/0202603 A1 | 10/2004 | Fischer et al. |
| 2004/0234445 A1 | 11/2004 | Serp et al. |
| 2004/0247503 A1 | 12/2004 | Hyeon |
| 2004/0265212 A1 | 12/2004 | Varadan et al. |
| 2005/0002850 A1 | 1/2005 | Niu et al. |
| 2005/0002851 A1 | 1/2005 | McElrath et al. |
| 2005/0025695 A1 | 2/2005 | Pradhan |
| 2005/0042162 A1 | 2/2005 | Resasco et al. |
| 2005/0046322 A1 | 3/2005 | Kim et al. |
| 2005/0074392 A1 | 4/2005 | Yang et al. |
| 2005/0079118 A1 | 4/2005 | Maruyama et al. |
| 2005/0100499 A1 | 5/2005 | Oya et al. |
| 2005/0176990 A1 | 8/2005 | Coleman et al. |
| 2005/0244325 A1 | 11/2005 | Nam et al. |
| 2005/0276743 A1 | 12/2005 | Lacombe et al. |
| 2006/0013757 A1 | 1/2006 | Edwin et al. |
| 2006/0032330 A1 | 2/2006 | Sato |
| 2006/0045837 A1 | 3/2006 | Nishimura |
| 2006/0078489 A1 | 4/2006 | Harutyunyan et al. |
| 2006/0104884 A1 | 5/2006 | Shaffer et al. |
| 2006/0104886 A1 | 5/2006 | Wilson |
| 2006/0104887 A1 | 5/2006 | Fujioka et al. |
| 2006/0133990 A1 | 6/2006 | Hyeon et al. |
| 2006/0141346 A1 | 6/2006 | Gordon et al. |
| 2006/0165988 A1 | 7/2006 | Chiang et al. |
| 2006/0191835 A1 | 8/2006 | Petrik et al. |
| 2006/0199770 A1 | 9/2006 | Bianco et al. |
| 2006/0204426 A1 | 9/2006 | Akins et al. |
| 2006/0225534 A1 | 10/2006 | Swihart et al. |
| 2006/0239890 A1 | 10/2006 | Chang et al. |
| 2006/0239891 A1 | 10/2006 | Niu et al. |
| 2006/0245996 A1 | 11/2006 | Xie et al. |
| 2006/0275956 A1 | 12/2006 | Konesky |
| 2007/0003470 A1 | 1/2007 | Smalley et al. |
| 2007/0020168 A1 | 1/2007 | Asmussen et al. |
| 2007/0031320 A1 | 2/2007 | Jiang et al. |
| 2007/0080605 A1 | 4/2007 | Chandrashekhar et al. |
| 2007/0116631 A1 | 5/2007 | Li et al. |
| 2007/0148962 A1 | 6/2007 | Kauppinen et al. |
| 2007/0149392 A1 | 6/2007 | Ku et al. |
| 2007/0183959 A1 | 8/2007 | Charlier et al. |
| 2007/0189953 A1 | 8/2007 | Bai et al. |
| 2007/0207318 A1 | 9/2007 | Jin et al. |
| 2007/0209093 A1 | 9/2007 | Tohji et al. |
| 2007/0253886 A1 | 11/2007 | Abatzoglou et al. |
| 2007/0264187 A1 | 11/2007 | Harutyunyan et al. |
| 2007/0280876 A1 | 12/2007 | Tour et al. |
| 2007/0281087 A1 | 12/2007 | Harutyunyan et al. |
| 2008/0003170 A1 | 1/2008 | Buchholz et al. |
| 2008/0003182 A1 | 1/2008 | Wilson et al. |

(56) References Cited

U.S. PATENT DOCUMENTS

| | | |
|---|---|---|
| 2008/0008760 A1 | 1/2008 | Bianco et al. |
| 2008/0014654 A1 | 1/2008 | Weisman et al. |
| 2008/0095695 A1 | 4/2008 | Shanov et al. |
| 2008/0118426 A1 | 5/2008 | Li et al. |
| 2008/0134942 A1* | 6/2008 | Brenner et al. ............... 106/672 |
| 2008/0160312 A1 | 7/2008 | Furukawa et al. |
| 2008/0169061 A1 | 7/2008 | Tour et al. |
| 2008/0176069 A1 | 7/2008 | Ma et al. |
| 2008/0182155 A1 | 7/2008 | Choi et al. |
| 2008/0193367 A1 | 8/2008 | Kalck et al. |
| 2008/0217588 A1 | 9/2008 | Arnold et al. |
| 2008/0226538 A1 | 9/2008 | Rumpf et al. |
| 2008/0233402 A1 | 9/2008 | Carlson et al. |
| 2008/0260618 A1 | 10/2008 | Kawabata |
| 2008/0274277 A1 | 11/2008 | Rashidi et al. |
| 2008/0279753 A1 | 11/2008 | Harutyunyan |
| 2008/0280136 A1 | 11/2008 | Zachariah et al. |
| 2008/0296537 A1 | 12/2008 | Gordon et al. |
| 2008/0299029 A1 | 12/2008 | Grosboll et al. |
| 2008/0305028 A1 | 12/2008 | McKeigue et al. |
| 2008/0305029 A1 | 12/2008 | McKeigue et al. |
| 2008/0305030 A1 | 12/2008 | McKeigue et al. |
| 2008/0318357 A1 | 12/2008 | Raffaelle et al. |
| 2009/0001326 A1 | 1/2009 | Sato et al. |
| 2009/0004075 A1 | 1/2009 | Chung et al. |
| 2009/0011128 A1 | 1/2009 | Oshima et al. |
| 2009/0035569 A1 | 2/2009 | Gonzalez Moral et al. |
| 2009/0056802 A1 | 3/2009 | Rabani |
| 2009/0074634 A1 | 3/2009 | Tada et al. |
| 2009/0081454 A1 | 3/2009 | Axmann et al. |
| 2009/0087371 A1 | 4/2009 | Jang et al. |
| 2009/0087622 A1 | 4/2009 | Busnaina et al. |
| 2009/0124705 A1 | 5/2009 | Meyer et al. |
| 2009/0134363 A1 | 5/2009 | Bordere et al. |
| 2009/0136413 A1 | 5/2009 | Li et al. |
| 2009/0140215 A1 | 6/2009 | Buchholz et al. |
| 2009/0186223 A1 | 7/2009 | Saito et al. |
| 2009/0191352 A1 | 7/2009 | DuFaux et al. |
| 2009/0203519 A1 | 8/2009 | Abatzoglou et al. |
| 2009/0208388 A1 | 8/2009 | McKeigue et al. |
| 2009/0208708 A1 | 8/2009 | Wei et al. |
| 2009/0220392 A1 | 9/2009 | McKeigue et al. |
| 2009/0226704 A1 | 9/2009 | Kauppinen et al. |
| 2009/0257945 A1 | 10/2009 | Biris et al. |
| 2009/0286084 A1 | 11/2009 | Tennent et al. |
| 2009/0286675 A1 | 11/2009 | Wei et al. |
| 2009/0294753 A1 | 12/2009 | Hauge et al. |
| 2009/0297846 A1 | 12/2009 | Hata et al. |
| 2009/0297847 A1 | 12/2009 | Kim et al. |
| 2009/0301349 A1 | 12/2009 | Afzali-Ardakani et al. |
| 2010/0004468 A1 | 1/2010 | Wong et al. |
| 2010/0009204 A1 | 1/2010 | Noguchi et al. |
| 2010/0028735 A1 | 2/2010 | Basset et al. |
| 2010/0034725 A1 | 2/2010 | Harutyunyan |
| 2010/0062229 A1 | 3/2010 | Hata et al. |
| 2010/0065776 A1 | 3/2010 | Han et al. |
| 2010/0074811 A1 | 3/2010 | McKeigue et al. |
| 2010/0081568 A1 | 4/2010 | Bedworth |
| 2010/0104808 A1 | 4/2010 | Fan et al. |
| 2010/0129654 A1 | 5/2010 | Jiang et al. |
| 2010/0132259 A1 | 6/2010 | Haque |
| 2010/0132883 A1 | 6/2010 | Burke et al. |
| 2010/0150810 A1 | 6/2010 | Yoshida et al. |
| 2010/0158788 A1 | 6/2010 | Kim et al. |
| 2010/0159222 A1 | 6/2010 | Hata et al. |
| 2010/0160155 A1 | 6/2010 | Liang |
| 2010/0167053 A1 | 7/2010 | Sung et al. |
| 2010/0173037 A1 | 7/2010 | Jiang et al. |
| 2010/0173153 A1 | 7/2010 | Hata et al. |
| 2010/0196249 A1 | 8/2010 | Hata et al. |
| 2010/0196600 A1 | 8/2010 | Shibuya et al. |
| 2010/0209696 A1 | 8/2010 | Seals et al. |
| 2010/0213419 A1 | 8/2010 | Jiang et al. |
| 2010/0221173 A1 | 9/2010 | Tennent et al. |
| 2010/0222432 A1 | 9/2010 | Hua |
| 2010/0226848 A1 | 9/2010 | Nakayama et al. |
| 2010/0230642 A1 | 9/2010 | Kim et al. |
| 2010/0239489 A1 | 9/2010 | Harutyunyan et al. |
| 2010/0254860 A1 | 10/2010 | Shiraki et al. |
| 2010/0254886 A1 | 10/2010 | McElrath et al. |
| 2010/0260927 A1 | 10/2010 | Gordon et al. |
| 2010/0278717 A1 | 11/2010 | Suzuki et al. |
| 2010/0298125 A1 | 11/2010 | Kim et al. |
| 2010/0301278 A1 | 12/2010 | Hirai et al. |
| 2010/0303675 A1 | 12/2010 | Suekane et al. |
| 2010/0316556 A1 | 12/2010 | Wei et al. |
| 2010/0316562 A1 | 12/2010 | Carruthers et al. |
| 2010/0317790 A1 | 12/2010 | Jang et al. |
| 2010/0320437 A1 | 12/2010 | Gordon et al. |
| 2011/0008617 A1 | 1/2011 | Hata et al. |
| 2011/0014368 A1 | 1/2011 | Vasenkov |
| 2011/0020211 A1 | 1/2011 | Jayatissa |
| 2011/0024697 A1 | 2/2011 | Biris et al. |
| 2011/0027162 A1 | 2/2011 | Steiner, III et al. |
| 2011/0027163 A1 | 2/2011 | Shinohara et al. |
| 2011/0033367 A1 | 2/2011 | Riehl et al. |
| 2011/0039124 A1 | 2/2011 | Ikeuchi et al. |
| 2011/0053020 A1 | 3/2011 | Norton et al. |
| 2011/0053050 A1 | 3/2011 | Lim et al. |
| 2011/0060087 A1 | 3/2011 | Noguchi et al. |
| 2011/0085961 A1 | 4/2011 | Noda et al. |
| 2011/0110842 A1 | 5/2011 | Haddon |
| 2011/0117365 A1 | 5/2011 | Hata et al. |
| 2011/0120138 A1 | 5/2011 | Gaiffi et al. |
| 2011/0150746 A1 | 6/2011 | Khodadadi et al. |
| 2011/0155964 A1 | 6/2011 | Arnold et al. |
| 2011/0158892 A1 | 6/2011 | Yamaki |
| 2011/0171109 A1 | 7/2011 | Petrik |
| 2011/0174145 A1 | 7/2011 | Ogrin et al. |
| 2011/0206469 A1 | 8/2011 | Furuyama et al. |
| 2011/0298071 A9 | 12/2011 | Spencer et al. |
| 2012/0034150 A1 | 2/2012 | Noyes |
| 2012/0083408 A1 | 4/2012 | Sato et al. |
| 2012/0107610 A1 | 5/2012 | Moravsky et al. |
| 2012/0137664 A1 | 6/2012 | Shawabkeh et al. |
| 2012/0148476 A1 | 6/2012 | Hata et al. |
| 2013/0154438 A1 | 6/2013 | Tan Xing Haw |
| 2014/0021827 A1 | 1/2014 | Noyes |
| 2014/0141248 A1 | 5/2014 | Noyes |
| 2014/0348739 A1 | 11/2014 | Denton et al. |
| 2015/0059527 A1 | 3/2015 | Noyes |
| 2015/0059571 A1 | 3/2015 | Denton et al. |
| 2015/0064092 A1 | 3/2015 | Noyes |
| 2015/0064096 A1 | 3/2015 | Noyes |
| 2015/0064097 A1 | 3/2015 | Noyes |
| 2015/0071846 A1 | 3/2015 | Noyes |
| 2015/0071848 A1 | 3/2015 | Denton et al. |
| 2015/0078982 A1 | 3/2015 | Noyes |

FOREIGN PATENT DOCUMENTS

| | | |
|---|---|---|
| WO | 2013158155 | 10/2013 |
| WO | 2013158156 | 10/2013 |
| WO | 2013158438 | 10/2013 |
| WO | 2013158439 | 10/2013 |
| WO | 2013158441 | 10/2013 |
| WO | 2014011206 | 1/2014 |
| WO | 2014011631 | 1/2014 |

OTHER PUBLICATIONS

Abatzoglou, Nicolas et al., "The use of catalytic reforming reactions for C02 sequestration as carbon nanotubes," Proceedings of the 2006 IASME/WSEAS International Conference on Energy & Environmental Systems, Chalkida, Greece, May 8-10, 2006 (pp. 21-26) (available at: http://www.wseas.us/e-library/conferences/2006evia/papers/516-19 3.pdf).

Abatzoglou, Nicolas et al., "Green Diesel from Fischer-Tropsch Synthesis: Challenges and Hurdles," Proc. of the 3rd IASME/WSEAS Int. Conf. on Energy, Environment, Ecosystems and Sustainable Development, Agios Nikolaos, Greece, Jul. 24-26, 2007, pp. 223-232.

(56) References Cited

OTHER PUBLICATIONS

Baker, B. A. and G. D. Smith "Metal Dusting in a Laboratory Environment—Alloying Addition Effects," Special Metals Corporation, undated.

Baker, B. A. and G. D. Smith, "Alloy Solutions to Metal Dusting Problems in the PetroChemical Industry," Special Metals Corporation, undated.

Bogue, Robert, Powering Tomorrow's Sensor: A Review of Technologies—Part 1, Sensor Review, 2010, pp. 182-186, vol. 30, No. 3.

Cha, S. I., et al., "Mechanical and electrical properties of cross•linked carbon nanotubes," Carbon 46 (2008) 482-488, Elsevier, Ltd.

Cheng, H.M. et al., "Large-scale and low-cost synthesis of single-walled carbon nanotubes by the catalytic pyrolysis of hydrocarbons," Applied Physics Letters 72:3282-3284, Jun. 22, 1998 (available at: http://carbon.imr.ac.cn/file/journai/1998/98_APL_72_3282-ChengH M.pdf).

Chun, Changmin, and Ramanarayanan, Trikur A., "Metal Dusting Corrosion of Metals and Alloys," 2007.

Chung, U.C., and W.S. Chung, "Mechanism on Growth of Carbon Nanotubes Using CO—H2 Gas Mixture," Materials Science Forum vols. 475-479 (2005) pp. 3551-3554.

Dai, et al., "Single-wall nanotubes produced by metal-catalyzed disproportionation of carbon monoxide," Chemical Physics Letters 260 (1996) 471-475, Elsevier.

Dresselhaus et al., Carbon Nanotubes Synthesis, Structure, Properties, and Applications. 2001, pp. 1-9, Springer.

Garmirian, James Edwin, "Carbon Deposition in a Bosch Process Using a Cobalt and Nickel Catalyst," PhD Dissertation, Massachusetts Institute of Technology, Mar. 1980, pp. 14-185.

Grobert, Nicole, "Carbon nanotubes—becoming clean," Materials Today, vol. 10, No. 1-2, Jan.- Feb. 2007, Elsevier, pp. 28-35.

Hata, Kenji, "From Highly Efficient Impurity-Free CNT Synthesis to DWNT forests, CNTsolids and Super-Capacitors," unknown date, unknown publisher, Research Center for Advanced Carbon Materials, National Institute of Advanced Industrial Science and Technology (AIST), Tsukuba, 305-8565, Japan.

Hiraoka, Tatsuki, et al., "Synthesis of Single- and Double-Walled Carbon Nanotube Forests on Conducting Metal Foils," 9 J. Am. Chem. Soc. 2006, 128, 13338-13339.

Holmes, et al.; A Carbon Dioxide Reduction Unit Using Bosch Reaction and Expendable Catalyst Cartridges; NASA; 1970; available at https://archive.org/details/nasa_techdoc_19710002858.

Huang, Z.P., et al., "Growth of highly oriented carbon nanotubes by plasma-enhanced hot filament chemical vapor deposition," Applied Physics Letters 73:3845-3847, Dec. 28, 1998.

"INCONEL® alloy 693—Excellent Resistance to Metal Dusting and High Temperature Corrosion" Special Metals Product Sheet, 2005.

Kavetsky et al., Chapter 2, Radioactive Materials, Ionizing Radiation Sources, and Radioluminescent Light Sources for Nuclear Batteries, Polymers, Phosphors, and Voltaics for Radioisotope Microbatteries, Edited by Bower et al., 2002, pp. 39-59, CRC Press.

Krestinin, A. V., et al. "Kinetics of Growth of Carbon Fibers on an Iron Catalyst in Methane Pyrolysis: A Measurement Procedure with the Use of an Optical Microscope," Kinetics and Catalysis, 2008, vol. 49, No. 1, pp. 68-78.

Lal, Arch It, "Effect of Gas Composition and Carbon Activity on the Growth of Carbon Nanotubes," Masters Thesis, University of Florida, 2003.

Manasse et al., Schottky Barrier Betavoltaic Battery, IEEE Transactions on Nuclear Science, vol. NS-23, No. 1, Feb. 1976, pp. 860-870.

Manning, Michael Patrick, "An Investigation of the Bosch Process," PhD Dissertation, Massachusetts Institute of Technology, Jan. 1976.

Unknown author, "Metal Dusting," unknown publisher, undated.

Unknown author, "Metal Dusting of reducing gas furnace HK40 tube," unknown publisher, undated.

Muller-Lorenz and Grabke, Coking by metal dusting of steels, 1999, Materials and Corrosion 50, 614-621 (1999).

Nasibulin, Albert G., et al., "An essential role of C02 and H20 during single-walled CNT synthesis from carbon monoxide," Chemical Physics Letters 417 (2005) 179-184.

Nasibulin, Albert G., et al., "Correlation between catalyst particle and single-walled carbon nanotube diameters," Carbon 43 (2005) 2251-2257.

Noordin, Mohamad and Kong Yong Liew, "Synthesis of Alumina Nanofibers and Composites," in Nanofibers, pp. 405-418 (Ashok Kumar, ed., 2010) ISBN 978-953-7619-86-2 (available at http://www.intechopen.com/books/nanofibers/synthesis-of-alumina• nanofibers-and-composites).

Pender, Mark J., et al., "Molecular and polymeric precursors to boron carbide nanofibers, nanocylinders, and nanoporous ceramics," Pure Appl. Chem., vol. 75, No. 9, pp. 1287-1294, 2003.

Ruckenstein, E. and H.Y. Wang, "Carbon Deposition and Catalytic Deactivation during C02 Reforming of CH4 over Co/?-Al203 Catalysts," Journal of Catalysis, vol. 205, Issue 2, Jan. 25, 2002, pp. 289-293.

Sacco, Albert Jr., "An Investigation of the Reactions of Carbon Dioxide, Carbon Monoxide, Methane, Hydrogen, and Water over Iron, Iron Carbides, and Iron Oxides," PhD Dissertation, Massachusetts Institute of Technology, Jul. 1977, pp. 2, 15-234.

SAE 820875 Utilization of Ruthenium and Ruthenium—Iron Alloys as Bosch Process Catalysts. Jul. 19-21, 1982.

SAE 911451 Optimization of Bosch Reaction, Jul. 15-18, 1991.

Singh, Jasprit, Semiconductor Devices, An Introduction, 1994, pp. 86-93, 253-269.

Singh, Jasprit, Semiconductor Devices, Basic Principles, Chapter 6, Semiconductor Junctions with Metals and Insulators, 2001, pp. 224-244, Wiley.

Skulason, Egill, Metallic and Semiconducting Properties of Carbon Nanotubes, Modern Physics, Nov. 2005, slide presentation, 21 slides, available at https://notendur.hi.is/egillsk/stuff/annad/Egiii. Slides2.pdf, last visited Apr. 28, 2014.

Songsasen, Apisit and Paranchai Pairgreethaves, "Preparation of Carbon Nanotubes by Nickel Catalyzed Decomposition of Liquefied Petroleum Gas (LPG)," Kasetsart J. (Nat. Sci.) 35 : 354-359 (2001) (available at: http://kasetsartjournal.ku.ac.th/kuj_files/2008/A0804251023348734.pdf).

Szakalos, P., "Mechanisms and driving forces of metal dusting," Materials and Corrosion, 2003, 54, No. 10, pp. 752-762.

Tsai, Heng-Yi, et al., "A feasibility study of preparing carbon nanotubes by using a metal dusting process," Diamond & Related Materials 18 (2009) 324-327, Elsevier.

Tse, Anthony N., Si—Au Schottky Barrier Nuclear Battery, A Thesis submitted to the Faculty in partial fulfillment of the requirement for the degree of Doctor of Engineering, Thayer School of Engineering, Dartmouth College, Hanover, New Hampshire, Nov. 1972, pp. 31-57.

Wilson, Richard B., "Fundamental Investigation of the Bosch Reaction," PhD Dissertation, Massachusetts Institute of Technology, Jul. 1977, pp. 12,23, 37, 43, 44, 62, 70, 80, 83-88, 98.

Wei, et al. "The mass production of carbon nanotubes using a nano-agglomerate fluidized bed reactor: A multiscale space-time analysis," Powder Technology 183 (2008) 10-20, Elsevier.

XP-002719593 Thomson abstract.

Zeng, Z., and Natesan, K., Relationship between the Growth of Carbon Nanofilaments and Metal Dusting Corrosion, 2005, Chem. Mater. 2005, 17, 3794-3801.

International Preliminary Report on Patentability, for International Application No. PCT/US2013/000075, dated Oct. 21, 2014, 7 pages.

PCT International Search Report and Written Opinion, PCT/US2013/000075, dated Jun. 26, 2013.

Notice of First Office Action of corresponding, copending Chinese Application No. 201380020288.2 dated Aug. 31, 2015, 3 pages.

Text of Notice of the First Office Action of corresponding, copending Chinese Application No. 201380020288.2 dated Aug. 31, 2015, 6 pages.

\* cited by examiner

METHODS FOR TREATING AN OFFGAS CONTAINING CARBON OXIDES

PRIORITY CLAIM

This application is a national phase entry under 35 U.S.C. §371 of International Patent Application PCT/US2013/000075, filed Mar. 15, 2013, designating the United States of America and published in English as International Patent Publication WO 2013/158158 A1 on Oct. 24, 2013, which claims the benefit of the filing date of U.S. Provisional Patent Application Ser. No. 61/624,513, filed Apr. 16, 2012, for "Methods for Treating an Offgas Containing Carbon Oxides," the disclosure of which is hereby incorporated herein in its entirety by this reference.

TECHNICAL FIELD

Embodiments of the disclosure relate to the conversion of an offgas into solid carbon products and the use of such solid carbon products in the product or production process.

BACKGROUND

U.S. Patent Publication No. 2012/0034150 A1, published Feb. 9, 2012, the disclosure of which is hereby incorporated herein in its entirety by this reference, discloses background information hereto.

Additional information is disclosed in the following documents, the disclosure of each of which is hereby incorporated herein in its entirety by this reference:
1. International Application No. PCT/US2013/00072, filed Mar. 15, 2013, for "Methods and Structures for Reducing Carbon Oxides with Non-Ferrous Catalysts," which claims the benefit of U.S. Provisional Patent Application Ser. No. 61/624,702, filed Apr. 16, 2012, in the name of Dallas B. Noyes;
2. International Application No. PCT/US2013/00076, filed Mar. 15, 2013, for "Methods and Systems for Thermal Energy Recovery from Production of Solid Carbon Materials by Reducing Carbon Oxides," which claims the benefit of U.S. Provisional Patent Application Ser. No. 61/624,573, filed Apr. 16, 2012, in the name of Dallas B. Noyes;
3. International Application No. PCT/US2013/00077, Mar. 15, 2013, for "Methods for Producing Solid Carbon by Reducing Carbon Dioxide," which claims the benefit of U.S. Provisional Patent Application Ser. No. 61/624,723, filed Apr. 16, 2012, in the name of Dallas B. Noyes;
4. International Application No. PCT/US2013/00073, filed Mar. 15, 2013, for "Methods and Reactors for Producing Solid Carbon Nanotubes, Solid Carbon Clusters, and Forests," which claims the benefit of U.S. Provisional Patent Application Ser. No. 61/624,753, filed Apr. 16, 2012, in the name of Dallas B. Noyes;
5. International Application No. PCT/US2013/00071, filed Mar. 15, 2013, for "Methods for Using Metal Catalysts in Carbon Oxide Catalytic Converters," which claims the benefit of U.S. Provisional Patent Application Ser. No. 61/624,848, filed Apr. 16, 2012, in the name of Dallas B. Noyes;
6. International Application No. PCT/US2013/00081, filed Mar. 15, 2013, for "Methods and Systems for Capturing and Sequestering Carbon and for Reducing the Mass of Carbon Oxides in a Waste Gas Stream," which claims the benefit of U.S. Provisional Patent Application Ser. No. 61/624,462, filed Apr. 16, 2012, in the name of Dallas B. Noyes;
7. International Application No. PCT/US2013/00078, filed Mar. 15, 2013, for "Methods and Systems for Forming Ammonia and Solid Carbon Products," which claims the benefit of U.S. Provisional Patent Application Ser. No. 61/671,464, filed Jul. 13, 2012, in the name of Dallas B. Noyes; and
8. International Application No. PCT/US2013/00079, filed Mar. 15, 2013, for "Carbon Nanotubes Having a Bimodal Size Distribution," which claims the benefit of U.S. Provisional Patent Application Ser. No. 61/637,229, filed Apr. 23, 2012, in the name of Dallas B. Noyes.

Solid carbon has numerous commercial applications. These applications include the longstanding use of carbon black and carbon fibers as filler material in tires, inks, etc.; use of various forms of graphite (e.g., pyrolytic graphite in heat shields); and innovative and emerging applications for carbon nanotubes (CNTs) and buckminsterfullerenes. CNTs are valuable because of their unique material properties, including strength, current-carrying capacity, and thermal and electrical conductivity. Current bulk use of CNTs includes use as additives to resins in the manufacture of composites. Research and development on CNTs is continuing, with a wide variety of applications in use or under consideration. One obstacle to widespread use of CNTs, however, has been the cost of manufacture. Conventional methods for the manufacture of solid carbon typically involve the pyrolysis of hydrocarbons in the presence of a suitable catalyst. Hydrocarbons are typically used as the carbon source, due to abundant availability and relatively low cost.

Carbon oxides, particularly carbon dioxide, are abundant gases present in ambient air and point-source emissions, such as exhaust gases generated by hydrocarbon combustion or off-gases generated by various manufacturing processes. Conventional aluminum manufacture, for example, involves the reduction of alumina ($Al_2O_3$). The process typically uses sacrificial carbon anodes to both deliver the electrical energy, and the carbon that reduces the aluminum oxides in the ore to produce the aluminum and carbon dioxide. Approximately two tons of carbon dioxide are produced for each ton of alumina that is reduced. Similarly, conventional steel manufacture involves the reduction of the oxides of iron present in iron ore or scrap iron. Carbon (in the form of coke, or in the form of sacrificial carbon anodes) is typically used as the reducing agent in the manufacture of steel, producing large amounts of carbon dioxide. Cement manufacture involves calcination, heating a raw material such as limestone (calcium carbonate) in a kiln, which liberates carbon dioxide. In addition to the carbon dioxide formed during calcination, carbon dioxide may be formed by the combustion of fuels (e.g., coal, natural gas, etc.) used to drive the calcination process, which may be either direct (combustion occurring within the calciner) or indirect (combustion occurring outside the calciner, with resultant heat transferred to the calciner). Worldwide, cement plants contribute about 5% of the total carbon dioxide emitted to the atmosphere from industrial processes. Cement manufacture is also associated with emission of various other waste products, including $NO_x$ (primarily NO), sulfur compounds (primarily $SO_2$, with some sulfuric acid and hydrogen sulfide), hydrochloric acid, and particulate matter, including dust. The concentration of carbon dioxide in flue gases from cement plants is typically 15%-30% by volume, significantly higher than in flue gases from power plants (3%-15% by volume).

Concerns about greenhouse gases are encouraging industry and governments to find ways to minimize carbon dioxide production and its release into the atmosphere. Some methods for reducing carbon dioxide emissions involve capture and sequestration of the carbon dioxide (e.g., by injection into a geological formation). These methods, for example, form the basis for some "green" coal-fired power stations. In current practice, however, capture and sequestration of the carbon dioxide entails significant cost.

There is a spectrum of reactions involving carbon, oxygen, and hydrogen wherein various equilibria have been identified. Hydrocarbon pyrolysis involves equilibria between hydrogen and carbon that favors solid carbon production, typically with little or no oxygen present. The Boudouard reaction, also called the "carbon monoxide disproportionation reaction," is the range of equilibria between carbon and oxygen that favors solid carbon production, typically with little or no hydrogen present. The Bosch reaction is within a region of equilibria where all of carbon, oxygen, and hydrogen are present under reaction conditions that also favor solid carbon production.

The relationship between the hydrocarbon pyrolysis, Boudouard, and Bosch reactions may be understood in terms of a C—H—O equilibrium diagram, as shown in FIG. 1. The C—H—O equilibrium diagram of FIG. 1 shows various known routes to solid carbon, including, carbon nanotubes ("CNTs"). The hydrocarbon pyrolysis reactions occur on the equilibrium line that connects H and C and in the region near the left edge of the triangle to the upper left of the dashed lines. Two dashed lines are shown because the transition between the pyrolysis zone and the Bosch reaction zone may change with reactor temperature. The Boudouard, or carbon monoxide disproportionation reactions, occur near the equilibrium line that connects O and C (i.e., the right edge of the triangle). In this zone, the Boudouard reaction is thermodynamically preferred over the Bosch reaction. The equilibrium lines for various temperatures that traverse the diagram show the approximate regions in which solid carbon will form. For each temperature, solid carbon may form in the regions above the associated equilibrium line, but will not generally form in the regions below the equilibrium line. In the region between the pyrolysis zone and the Boudouard reaction zone and above a particular reaction temperature curve, the Bosch reaction is thermodynamically preferred over the Boudouard reaction.

The use of carbon oxides as a carbon source in production of solid carbon has largely been unexploited. The immediate availability of ambient air may provide economical sources of carbon dioxide for local manufacture of solid carbon products. Because point-source emissions have much higher concentrations of carbon dioxide than ambient air, however, they are often economical sources from which to harvest carbon dioxide.

DISCLOSURE

In some embodiments, a method of treating an offgas containing at least one carbon oxide gas, water vapor, and particulate matter includes purifying the offgas to remove at least a portion of the particulate matter to produce an intermediate stream, condensing water from the intermediate stream to produce a dried carbon oxide feedstock, and converting at least a portion of the carbon oxides in the dried carbon oxide feedstock into solid carbon products. The method may also include using suitable reducing agents (typically hydrogen or methane) in a catalytic converter.

In other embodiments, a method includes purifying an offgas stream to remove particulates to produce an intermediate stream, removing at least a portion of gases from the intermediate stream to produce a carbon oxide feedstock, condensing water from the carbon oxide feedstock to produce a dried carbon oxide feedstock, and passing the dried carbon oxide feedstock through a multi-stage catalytic converter to convert at least a portion of carbon oxides in the dried carbon oxide feedstock into solid carbon products. At least one first stage of the multi-stage catalytic converter is configured to catalyze methane-reforming reactions and convert methane and at least a portion of carbon dioxide of the dried carbon oxide feedstock to a synthesis gas stream. At least one second stage of the multi-stage catalytic converter is configured to catalyze Bosch reactions and convert at least a portion of carbon dioxide or at least a portion of carbon monoxide of the dried carbon oxide feedstock to solid carbon and water.

In other embodiments, the solid carbon produced by the catalytic conversion of a portion of carbon dioxide or at least a portion of carbon monoxide of the dried carbon oxide feedstock derived from the offgas is used as an additive to improve the value of a product. For example, CNTs added to Portland cement may produce a more durable, self-healing, stronger concrete. As a further example, aluminum alloyed with carbon nanotubes may be lighter, have a higher tensile strength, and have other desirable properties in comparison to conventional materials. As yet another example, CNTs can be added to steel to produce alloys with desired mechanical properties.

In some embodiments, the solid carbon produced by the catalytic conversion of a portion of the carbon oxides is further processed to produce carbon anodes so that the carbon may be reused in industrial processes, for example, the smelting of aluminum or steel.

MODE(S) FOR CARRYING OUT THE INVENTION

The disclosure includes methods for treating an offgas from an industrial process. The methods may be used to process byproducts of cement manufacture, aluminum smelting, steel smelting, or other processes to produce solid carbon products and water. Solid carbon products may include allotropes of carbon or morphologies thereof, including graphite, pyrolytic graphite, graphene, carbon black, fibrous carbon, buckminsterfullerenes, single-wall CNTs, multi-wall CNTs, platelets, or nanodiamond. The type, purity, and homogeneity of solid carbon products may be controlled by the reaction conditions, such as reaction time, temperature, pressure, partial pressure of reactants, and/or catalyst properties.

The methods utilize Bosch reactions to produce solid carbon products and water by the reduction of carbon dioxide or carbon monoxide with hydrogen, hydrocarbons, alcohols, or mixtures thereof. Reaction conditions may be optimized to produce a selected type of solid carbon. The catalytic conversion process may include a variety of separation technologies to remove the solid carbon and water and may include recycling the tail gases with makeup gases added as necessary.

Figure 1:
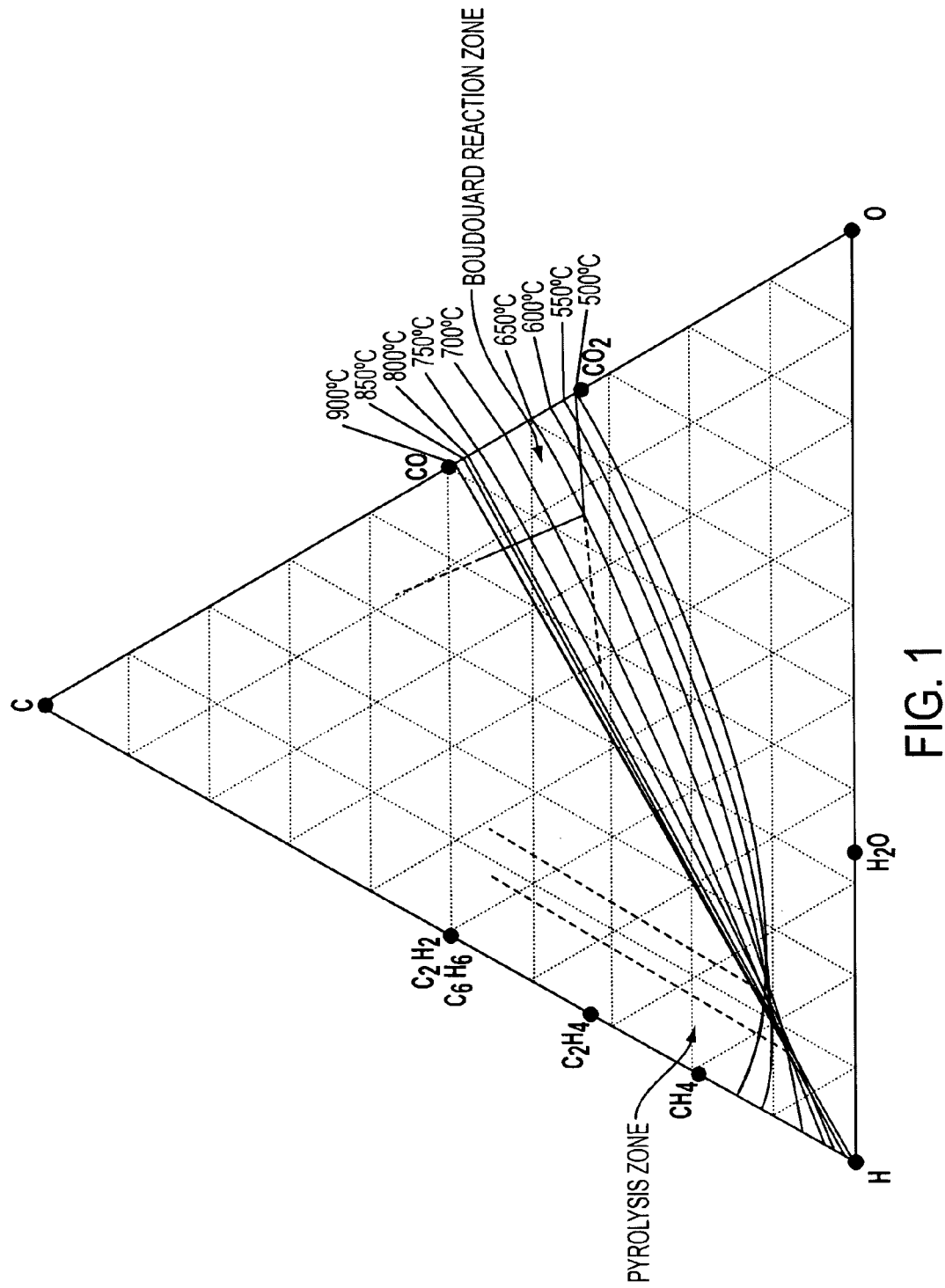
FIG. 1 depicts a C—H—O equilibrium diagram.

The methods disclosed herein include reactions in the interior region of the phase diagram shown in FIG. 1, including multi-step reactions (e.g., methane-reforming reactions, followed by reactions in the Bosch reaction zone), where equilibrium may be established between solid carbon, oxygen, hydrogen, and compounds of carbon, hydrogen and/or oxygen. The central region of FIG. 1 has several points favorable for the formation of CNTs and other allotropes and associated morphologies of solid carbon. The type of solid carbon produced may be selectively controlled through selection and processing of the catalysts, reaction gas mixtures, and reaction conditions. Thus, these methods open new routes to the processing of carbon-containing gases and the production of valuable solid carbon products such as CNTs.

In embodiments, a process offgas is used as a feedstock to produce solid carbon products. In some embodiments, the process offgas includes $CO_2$ or other gases formed in a calciner or another process, such as aluminum or steel smelting. As used herein, the term "offgas" means and includes any gas from any process that contains significant quantities of a carbon oxide (i.e., a higher concentration of $CO_2$ and/or CO than is present in ambient air). An offgas may also contain water (gaseous and/or liquid), particulate matter, $SO_x$, $NO_x$, $N_2$, $O_2$, etc. An offgas may be formed from heating limestone ($CaCO_3$) to liberate $CO_2$, as in the production of cements, including Portland cement. Other offgas emissions may originate from the smelting of metal ores such as alumina ($Al_2O_3$) or iron oxides. Other offgas emissions may be formed from the conversion of sodium bicarbonate ($NaHCO_3$) to soda ash ($Na_2CO_3$). For processes using direct heating, offgases may also include combustion products, unburned fuel, ash, etc., from the combustion of fuel (e.g., coal, natural gas). An offgas may be formed from the reaction of a sacrificial carbon anode in reducing the oxides of a primary ore or raw material as, for example, in aluminum or steel smelting. The composition of an offgas may depend on a variety of factors, such as the type of fuel used to operate processing equipment, conditions (e.g., temperature, pressure), the composition of feed materials (e.g., limestone, alumina, sodium bicarbonate, etc.), flow rates, etc.

In some embodiments, the offgas may be purified to remove solid particulates and contaminants, such as sulfur and phosphorus compounds that are catalyst poisons. The offgases may be further purified to remove other gaseous constituents such as oxygen, water, and nitrogen that may result in unwanted side reactions during the formation of solid carbon products. Specific purification and concentration processes may be selected based on the properties of the offgas.

The processes described herein may result in the formation of solid carbon products and water. The water may subsequently be condensed, and the latent heat extracted for heating purposes, or as part of a low-pressure power-extraction cycle. The water may be treated to remove any dissolved reaction gases, filtered to remove solid contaminants, and/or released to the environment. Pure water may be formed as a co-product of some embodiments of the processes disclosed herein.

The methods disclosed herein use the offgas as an economically valuable feedstock. Use of offgas as a feedstock in solid carbon production may reduce or eliminate costs of carbon capture and sequestration, and may simultaneously convert carbon dioxide to a salable product. Thus, the methods may be incorporated with conventional industrial processes, such as cement manufacturing processes or aluminum- or steel-smelting operations. Combining the processes with fossil-fuel combustion processes may also be beneficial because formation of solid carbon products by such processes may be more economical than existing separation and sequestration methods. Furthermore, solid carbon products may be recycled to processes producing the offgas or related processes (e.g., solid carbon products may be formed into sacrificial carbon anodes or other carbon forms for recycle into production processes). The solid carbon products may further be incorporated into the products resulting from the processes to add desirable properties to the products (e.g., CNT-enhanced cements, aluminum alloys, and steel).

The methods disclosed herein produce solid carbon products, such as buckminsterfullerenes, including carbon nanotubes, as well as graphite, coke, and carbon black, using carbon oxides present in offgas as the carbon source. The methods thus involve catalytic conversion of carbon oxides to solid carbon and water. The carbon oxides may be purified and concentrated as needed. High-purity carbon oxides and reducing agents may yield high-purity solid carbon products.

The Bosch reactions, as disclosed herein, use hydrogen, hydrocarbons, alcohols, or mixtures thereof to reduce carbon oxides (e.g., carbon dioxide, carbon monoxide, or mixtures thereof) to solid carbon (e.g., graphite, graphene, carbon black, fibrous carbon, buckminsterfullerene, single-wall CNTs, multi-wall CNTs, platelets, nanodiamond, etc.) and water. These reactions may be conducted at temperatures from approximately 450° C. to approximately 1,000° C. in the presence of a catalyst such as iron, iron- and carbon-containing compounds such as cementite, and a wide variety of other metals, including nickel, cobalt, molybdenum, and mixtures thereof. The Bosch reaction of carbon dioxide and hydrogen to form CNTs, graphite, or $C_{60}$ fullerene is mildly exothermic (heat producing) and proceeds with the stoichiometry as shown in Equation 1:

$$CO_2 + 2H_2 \leftrightarrow C_{(s)} + 2H_2O \qquad \text{(Equation 1)}.$$

The formation of CNTs in this Bosch reaction releases approximately 24.9 kcal/mol at 650° C. (i.e., ΔH=−24.9 kcal/mol). The formation of graphite in this Bosch reaction releases approximately 23.8 kcal/mol at 650° C. The formation of $C_{60}$ fullerene in this Bosch reaction releases approximately 13.6 kcal/mol at 650° C. The formation of carbon lamp black in this Bosch reaction is endothermic, consuming approximately 147.5 kcal/mol at 650° C. (i.e., ΔH is +147.5 kcal/mol). The Bosch reactions are reversible; in the reverse of the Bosch reactions, solid carbon is oxidized by the water to form carbon dioxide and hydrogen in an oxygen-shift reaction commonly known as the water-gas reaction. The water concentration in the reaction gases may be controlled to help obtain the purity and quality of solid carbon product desired. For example, because the Gibbs free energy of carbon nanotubes is lower than that of graphite and amorphous carbon, the water-gas reaction preferentially oxidizes graphite and amorphous carbon, leaving relatively pure CNTs.

The Bosch reaction of Equation 1 is believed to be a two-step reaction with an overall release of energy (i.e., the reaction is exothermic). In the first step of the reaction, carbon dioxide reacts with hydrogen to form carbon monoxide and water in a reverse water-gas shift reaction:

$$CO_2 + H_2 \leftrightarrow CO + H_2O \quad \text{(Equation 2).}$$

Equation 2 is slightly endothermic at 650° C., requiring a heat input of about 8.47 kcal/mol (i.e., $\Delta H = +8.47$ kcal/mol). In the second step of the reaction, CO reacts with hydrogen in the presence of a catalyst to form solid carbon and water:

$$CO + H_2 \leftrightarrow C_{(s)} + H_2O \quad \text{(Equation 3).}$$

Equation 3 may occur with stoichiometric amounts of reactants, or with excess $CO_2$ or $H_2$. Equation 3 is exothermic at 650° C., releasing 33.4 kcal/mol ($1.16 \times 10^4$ joules/gram of $C_{(s)}$) when CNTs are formed (i.e., $\Delta H = -33.4$ kcal/mol). Values of $\Delta H$ for Equation 3 may be calculated for other carbon products by the difference between the $\Delta H$ value for Equation 1 for that particular carbon product and the $\Delta H$ value for Equation 2.

The methane-reforming reactions, as described herein, include the reaction of methane with carbon dioxide or water:

$$CH_4 + CO_2 \leftrightarrow 2CO + 2H_2 \quad \text{(Equation 4),}$$

$$CH_4 + H_2O \leftrightarrow CO + 3H_2 \quad \text{(Equation 5).}$$

The methane-reforming reactions produce carbon monoxide and hydrogen, which may form a gas stream suitable for Bosch reactions. The methane-reforming reactions typically occur at temperatures higher than temperatures at which Bosch reactions occur. In some embodiments, the methane-reforming reactions may precede Bosch reactions to supply hydrogen and carbon monoxide for Bosch reactions. Because methane-reforming reactions typically occur at higher temperatures than Bosch reactions, it may be desirable to add a cooler carbon oxide steam to gases flowing from methane-reforming reactions and cool the resulting mixed gas stream to a temperature suitable for subsequent Bosch reactions.

U.S. Pat. No. 7,794,690 (Abatzoglou et al.) teaches a dry reforming process for sequestration of carbon from an organic material. Abatzoglou discloses a process utilizing a two-dimensional (2D) carbon sequestration catalyst with, optionally, a 3D dry reforming catalyst. For example, Abatzoglou discloses a two-stage process for dry reformation of an organic material (e.g., methane, ethanol) and $CO_2$ over a 3D catalyst to form syngas, in a first stage, followed by carbon sequestration of syngas over a 2D carbon steel catalyst to form CNTs and carbon nanofilaments. The 2D catalyst may be an active metal (e.g., Ni, Rh, Ru, Cu—Ni, Sn—Ni) on a nonporous metallic or ceramic support, or an iron-based catalyst (e.g., steel), on a monolithic support. The 3D catalyst may be of similar composition, or may be a composite catalyst (e.g., $Ni/ZrO_2$—$Al_2O_3$) over a similar support. Abatzoglou teaches preactivation of a 2D catalyst by passing an inert gas stream over a surface of the catalyst at a temperature beyond its eutectic point, to transform the iron into its alpha phase. Abatzoglou teaches minimizing water in the two-stage process or introducing water in low concentrations (0 to 10 wt %) in a reactant gas mixture during the dry reformation first stage.

The methods disclosed herein involve the creation of solid carbon, and in particular, CNTs of different allotropes and morphologies, by the reduction of carbon oxides. Carbon oxides may be products of calcination, such as the calcination of limestone in cement production, or from other processes such as aluminum smelting. The carbon oxides and one or more reducing agents may be injected into a reactor or reaction zone that has been preheated, such as to a predetermined reaction temperature. Optionally, the carbon oxides and reducing agent or agents may be preheated prior to injecting them into a reactor or reaction zone. The reactions typically occur in the presence of a catalyst. The catalyst composition and grain size may affect the morphology of the resulting solid carbon products. For example, the diameter of the carbon nanotubes appears to be closely related to the characteristic size of the catalyst particle, or grain size of bulk catalyst. The reaction conditions, including the temperature and pressure of the reactor, the residence time of the reaction gases, and the grain size of the catalyst may be controlled to obtain solid carbon products having selected characteristics. Reaction tail gas and product mixtures may pass through one or more condensers to remove excess water and to control the partial pressure of water vapor in the reaction gas mixture. In certain embodiments hereof, the partial pressure of water in the reaction is regulated by various means, including recycling and condensation of water, to influence, e.g., the structure or other aspects of the composition of carbon products produced. The partial pressure of water appears to assist in obtaining certain desirable carbon allotropes. A dried tail gas stream may be recycled as desired, typically with preheating by counterflowing with the reactor tail gas and product mixture streams.

Solid carbon of various allotropes and morphologies may be produced through carbon oxide reduction processes. Some of the solid carbon allotropes and morphologies that may be produced include graphite (e.g., pyrolytic graphite), graphene, carbon black, fibrous carbon, buckminsterfullerene, single-wall CNTs, and multi-wall CNTs, platelets, and nanodiamond.

In embodiments, reaction kinetics favorable to the formation of the desired species of solid carbon may be established through the use of suitable catalysts. For example, in reactions forming CNTs, higher reaction rates may correspond to smaller diameter CNTs, and lower reaction rates may correspond to larger diameter CNTs. Suitable catalysts include metals selected from groups 2 through 15 of the periodic table, such as groups 5 through 10, (e.g., nickel, molybdenum, chromium, cobalt, tungsten, manganese, ruthenium, platinum, iridium, etc.), actinides, lanthanides, alloys thereof, combinations thereof, or compounds containing any such metals may accelerate the reaction rates of Equations 2, 3, and/or 4. Note that the periodic table may have various group numbering systems. As used herein, group 2 is the group including Be, group 3 is the group including Sc, group 4 is the group including Ti, group 5 is the group including V, group 6 is the group including Cr, group 7 is the group including Mn, group 8 is the group including Fe, group 9 is the group including Co, group 10 is the group including Ni, group 11 is the group including Cu, group 12 is the group including Zn, group 13 is the group including B, group 14 is the group including C, and group 15 is the group including N. Catalysts may facilitate operations at lower temperatures.

In some embodiments, a broad range of inexpensive and readily-available catalysts, including steel-based catalysts, may be used to catalyze the reactions disclosed herein. In certain embodiments, commercially available metals are used without special preparation. In certain embodiments, a steel-based catalyst is used in a reaction disclosed herein, without the need for activation of the catalyst before it is used. Iron alloys, including steel, may contain various allotropes of iron, including alpha-iron (austenite), gamma iron, and delta-iron. In some embodiments, reactions disclosed herein advantageously utilize an iron-based catalyst, wherein the iron is not in an alpha phase. In certain embodiments, a stainless steel containing iron primarily in the austenitic phase is used as a catalyst.

The use of commercial forms of commonly available metals may reduce the cost, complexity, and difficulty of producing solid carbon. For example, CNT forests may grow on commercial grades of steel, with the CNT forests forming directly on the steel without additional layers or surfaces isolating the steel from the CNT forest. CNTs form on materials such as on mild steel, 304 stainless steel, 316L stainless steel, steel wool, and 304 stainless steel wire.

304 stainless steel appears to catalyze the formation of CNTs under a wide range of temperatures, pressures, and gas compositions. However, the rate of formation of CNTs on 304 stainless steel appears to be relatively low, such that 304 stainless steel may be used effectively as a construction material for process equipment, with minimal deposition on surfaces thereof in normal operations. 316L stainless steel, in contrast, appears to catalyze the formation of solid carbon at significantly higher rates than 304 stainless steel, but may also form various morphologies of carbon. Thus, 316L stainless steel may be used as a catalyst to achieve high reaction rates, but particular reaction conditions may be maintained to control product morphology. Catalysts may be selected to include Cr, such as in amounts of about 22% or less by weight. For example, 316L stainless steel contains from about 16% to about 18.5% Cr by weight. Catalysts may also be selected to include Ni, such as in amounts of about 8% or more by weight. For example, 316L stainless steel contains from about 10% to about 14% Ni by weight. Catalysts of these types of steel have iron in an austenitic phase, in contrast to alpha-phase iron used as a catalyst in conventional processes. Given the favorable results observed with 316L stainless steel, the Ni and/or Cr may have a synergistic effect with Fe.

The morphology of carbon nanotubes grown on steel is dependent on the chemistry of the steel and the way it was processed. In general, steels with smaller grain sizes tend to produce smaller diameter carbon nanotubes. The grain size is both a function of the chemistry of the steel and the heat treating methods under which the grains formed. Mild steels often produce a primary population of carbon nanotubes with diameters over 100 nm, while stainless steels (such as 304 or 316L) produce a primary population of carbon nanotubes with diameters in the range of 20 nm and under. This may be due to any of a number of factors not presently fully understood; however, it appears to be related to the grain size and boundary shapes within the metal, where the characteristic size of these features controls the characteristic diameter of the population of carbon nanotubes grown on the surface of such steel samples.

Catalysts for use in methods disclosed herein may be in the form of nanoparticles or in the form of domains or grains and grain boundaries within a solid material. Catalysts may be selected to have a grain size related to a characteristic dimension of a desired diameter of the solid carbon product (e.g., a CNT diameter). Catalyst powder may be formed in or near the reaction zone by injecting an aerosol solution such that upon evaporation of a carrier solvent, a selected particle size distribution results. Alternatively, powdered catalyst may be entrained in a carrier gas and delivered to the reactor. Catalysts may be formed as described in U.S. Patent Application Publication No. 2012/0034150 A1. By selecting the catalyst and the reaction conditions, the process may be tuned to produce selected morphologies of solid carbon.

In some embodiments, the catalyst may be formed over a substrate or support, such as an inert oxide that does not participate in the reactions. However, the substrate is not necessary; in other embodiments, the catalyst material is an unsupported material, such as a bulk metal or particles of metal not connected to another material (e.g., loose particles, shavings, or shot, such as may be used in a fluidized-bed reactor). Catalysts, including an iron-based catalyst (e.g., steel, steel wool), may be used without a need for an additional solid support. In certain embodiments, reactions disclosed herein proceed without the need for a ceramic or metallic support for the catalyst. Omitting a solid support may simplify the setup of the reactor and reduce costs.

An optimum reaction temperature may be dependent on the composition of the catalyst and/or on the size of the catalyst particles. Catalyst materials having small particle sizes tend to have optimum reaction temperatures at lower temperatures than the same catalyst materials with larger particle sizes. For example, Bosch reactions may occur at temperatures in the range of approximately 450° C. to 950° C. with iron-based catalysts, depending on the particle size and composition, and the desired solid carbon product. In general, graphite and amorphous solid carbon form at lower temperatures within this range, and CNTs form at higher temperatures. CNTs may form at temperatures above about 600° C. In general, reactions proceed at a wide range of pressures, from near vacuum, to pressures of 4.0 MPa or higher. For example, CNTs may form in pressure ranges from about vacuum to in excess of about 6.2 MPa. In some embodiments, CNTs may be formed at about 0.34 MPa to about 0.41 MPa, or at a pressure of about 4.1 MPa. Typically, increasing the pressure increases the reaction rate.

Without being bound by any particular theory, carbon nanotubes appear to grow from a nucleating site that is the catalyzing particle. This catalyzing particle may be a domain in a piece of steel or steel wool, for example, or a discrete nanoparticle of iron in an aerosol or deposited on an inert substrate such as a quartz disk. The size of the carbon nanotube is generally proportional to the size of the nucleating site, with the ratio between the catalyst particle size and the CNT diameter observed to be about 1.3 to 1.6.

When using a solid catalyst, such as a wafer of steel, the carbon nanotubes appear to grow in a series of generations. While the mechanism is not fully understood, it appears that the reaction gases interact with the exposed surface particles and the carbon nanotubes begin to grow, lifting the nucleating catalyst particles off of the surface of the bulk catalyst (i.e., as tip growth). As the growth continues, it appears that additional nucleation particles form on the surface of the bulk catalyst and, in turn, catalyze additional carbon nanotube growth, lifting the prior generation of carbon nanotubes off of the surface of the bulk catalyst.

If a bulk catalyst sample is left in the reaction zone, these layers continue to form and lift off until the catalyst is consumed. The observation that each generation of CNTs detach from the underlying catalyst substrate means that a fluidized bed reactor where the CNTs are elutriated from the substrate, entrained in the gas flow, and subsequently harvested from the gas mixture may be an economical reactor design for growing carbon nanotube pillows. The layers of CNTs appear to have little or no binding to the bulk catalyst substrate or to each other.

Without being bound by any particular theory, oxidation and subsequent reduction of the catalyst surface appear to alter the grain structure and grain boundaries. Oxidation may first alter the surface of the metal catalyst in the oxidized areas. Subsequent reduction may result in further alteration of the catalyst surface. Thus, the grain size and grain boundary of the catalyst may be controlled by oxidizing and reducing the catalyst surface and by controlling the exposure time of the catalyst surface to the reducing gas and the oxidizing gas. The oxidation and/or reduction temperatures may be in the range from about 500° C. to about 1,200° C., from about 600° C. to about 1,000° C., or from about 700° C. to about 900° C. The resulting grain size may range from about 0.1 μm to about 500 μm, from about 0.2 μm to about 100 μm, from about 0.5 μm to about 10 μm, or from about 1.0 μm to about 2.0 μm. In some embodiments, the catalyst may be an oxidized metal (e.g., rusted steel) that is reduced before or during a reaction forming solid carbon. Without being bound to any particular theory, it is believed that removal of oxides leaves voids or irregularities in the surface of the catalyst material, and increases the overall surface area of the catalyst material.

Rust on steel has been observed to be a good catalyst for the formation of carbon nanotubes by the methods disclosed. Although the mechanism is not presently understood, it may be because the iron oxides comprising the rust are in effect a catalyst precursor. As the rusted samples are heated in the presence of a reducing agent such as hydrogen, the iron oxides decompose and the iron atoms coalesce to form small iron nanoparticles suitable for the catalysis of carbon nanotube growth. Initially heating the steel catalyst in the presence of hydrogen promotes reduction of the iron oxides in surface films and rust, and activates the steel catalysts. Oxidized metals do not appear to effectively catalyze the carbon oxide reduction reactions, and thus at present an initial reduction of such oxides is recommended as part of a startup procedure for reactors using steels as a catalyst.

Carbon activity ($A_c$) can be used as an indicator of whether solid carbon will form under particular reaction conditions (e.g., temperature, pressure, reactants, concentrations). Without being bound to any particular theory, it is believed that carbon activity is the key metric for determining which allotrope of solid carbon is formed. Higher carbon activity tends to result in the formation of CNTs; lower carbon activity tends to result in the formation of graphitic forms.

Carbon activity for a reaction forming solid carbon from gaseous reactants can be defined as the reaction equilibrium constant times the partial pressure of gaseous products, divided by the partial pressure of reactants. For example, in the reaction, $CO_{(g)} + H_{2(g)} \rightleftharpoons C_{(s)} + H_2O_{(g)}$, with a reaction equilibrium constant of K, the carbon activity $A_c$ is defined as $K \cdot (P_{CO} \cdot P_{H2}/P_{H2O})$. Thus, $A_c$ is directly proportional to the partial pressures of CO and $H_2$, and inversely proportional to the partial pressure of $H_2O$. Higher $P_{H2O}$ tends to inhibit CNT formation. The carbon activity of this reaction may also be expressed in terms of mole fractions and total pressure: $A_c = K \cdot P_T (Y_{CO} \cdot Y_{H2}/Y_{H2O})$, where $P_T$ is the total pressure and Y is the mole fraction of a species. Carbon activity generally varies with temperature because reaction equilibrium constants vary generally with temperature. Carbon activity also varies with total pressure for reactions in which a different number of moles of gas are produced than are consumed. Mixtures of solid carbon allotropes and morphologies thereof can be achieved by varying the catalyst and the carbon activity of the reaction gases in the reactor.

Various reactor designs may be used to facilitate the formation and collection of solid carbon products. Aerosol and fluidized-bed reactors are particularly suitable for high-volume continuous production of the solid carbon product. A fluid-wall reactor has the advantages of providing for the introduction of various substances (e.g., catalysts, additional reactants) and of minimizing or eliminating the accumulation of solid carbon products on reactor walls.

In some embodiments, the reactor is an aerosol reactor in which the catalyst is in a gas phase or in which the catalyst is preformed and selected for a specific size distribution, mixed into a liquid or carrier-gas solution, and then sprayed into the reactor (e.g., via electrospray). The catalyst may remain distributed in the gas phase or be deposited on solid surfaces in the reaction zone for the growth phase of the carbon product and subsequent transport of the product out of the reaction zone. In another embodiment, one or more reactors may be fluidized-bed reactors in which the catalyst or catalyst-coated particles are introduced into the reactor, and the solid carbon product is grown on the surface of the particles. The solid carbon may be elutriated in the reactor and carried out of the reactor entrained in the reaction gases, or the catalyst particles may be harvested and the solid carbon removed from the surface.

In some embodiments, the reactor is a batch reactor, in which the catalyst is either a fixed solid surface or is mounted on a fixed solid surface (e.g., catalyst nanoparticles deposited on an inert substrate), with the solid carbon grown on the catalyst, and the catalyst and solid carbon product periodically removed from the reactor. Alternatively, the reactors may be continuous, wherein solid carbon is removed from the catalyst as the solid carbon is formed. In some embodiments, a solid catalyst or catalyst mounted on a solid substrate is moved through a flowing gas stream, the resulting solid carbon product is harvested, the solid surface is prepared, and the substrate is reintroduced to the reactor. The solid substrate may be the catalyst material (e.g., a solid piece of steel or other alloy of catalyzing elements such as iron-, chromium-, molybdenum-, cobalt-, or nickel-containing alloys or superalloys) or a surface on which the catalyst is mounted.

In one embodiment, a fluidized-bed reactor is configured to retain the catalyst while allowing the solid carbon product to be entrained in the gas flow and to be lofted out of the reaction zone upon reaching a desired size. This control may be achieved through the shape of the reactor, the gas flow rates, or shape and flow rates in combination, and may allow control over the residence time of the elutriates and the corresponding size of the solid carbon product (e.g., the length of CNTs).

In one embodiment, particles in a fluidized-bed reactor are of a substantially uniform diameter. The diameter of the catalyst in the fluidized bed may be selected based on the particular reactor configuration, the flow rate of the reactants through the reactor, the shape of the catalyst, the density of the catalyst, and the density of the reactant gases and any inert carrier gases. The diameter of the catalyst particles may be selected to avoid entrainment of the catalyst with the reaction product and also to avoid channeling reactants through the bed. The gaseous reactants may pass through a diffuser or sparger to form a uniform flow pattern through the bed particles and to avoid channeling of gas through the particle bed.

A reactor may be coupled with heating and cooling mechanisms to control the temperature of the reactor. For example, a reactor may be configured such that products and excess reactant are recycled through a cooling mechanism to condense water vapor. The products and/or excess reactant may then be reheated and recycled through the reactor. By removing some of the water vapor in the recycled gases, the morphology of solid carbon formed may be controlled. Changing the partial pressure of water vapor changes the carbon activity of a mixture. The reactor may also be coupled to a carbon collector in which water and unreacted reactants are separated from the carbon products. The separated carbon products are collected and removed from the system.

Solid carbon products may be collected and separated from the gas stream or from solid surfaces on which they form, such as by elutriation, centrifugation, electrostatic precipitation, or filtration. The techniques for separation of the solid product from the gas stream and the catalyst may depend on the type of reactor. In one embodiment, a cyclone separator is used to separate and collect the solid carbon product. For a solid catalyst or solid-surface-mounted catalyst, the solid carbon product may be scraped or otherwise abraded from the surface of the solid carrier material. Alternatively, when using a solid catalyst, the solid carbon product may be rinsed off a surface with a solvent for further processing.

In some embodiments, small amounts of substances (e.g., sulfur) added to the reaction zone may be catalyst promoters that accelerate the growth of carbon products on the catalysts. Such promoters may be introduced into the reactor in a wide variety of compounds. Such compounds may be selected such that the decomposition temperature of the compound is below the reaction temperature. For example, if sulfur is selected as a promoter for an iron-based catalyst, the sulfur may be introduced into the reaction zone as a thiophene gas, or as thiophene droplets in a carrier gas. Examples of sulfur-containing promoters include thiophene, hydrogen sulfide, heterocyclic sulfides, and inorganic sulfides. Other catalyst promoters include volatile lead, bismuth compounds, ammonia, nitrogen, excess hydrogen (i.e., hydrogen in a concentration higher than stoichiometric), and combinations of these.

In some embodiments, a process for converting a carbon source to a solid carbon product may include purifying an offgas to remove particulates and produce an intermediate stream, removing at least a portion of gases from the intermediate stream to produce a carbon oxide feedstock, condensing water from the carbon oxide feedstock to produce a dried carbon oxide feedstock, and/or converting at least a portion of carbon oxides in the dried carbon oxide feedstock into solid carbon products. In other embodiments, at least a portion of the gases may react to form other gases before or after removing particulates. In other embodiments, a highly concentrated carbon oxide feedstock may be derived from the offgas stream by a multi-step process, which may include any combination of techniques to remove solid and unwanted gaseous constituents, such as scrubbing, condensation, amine absorption, pressure swing absorption, etc.

Figure 2:
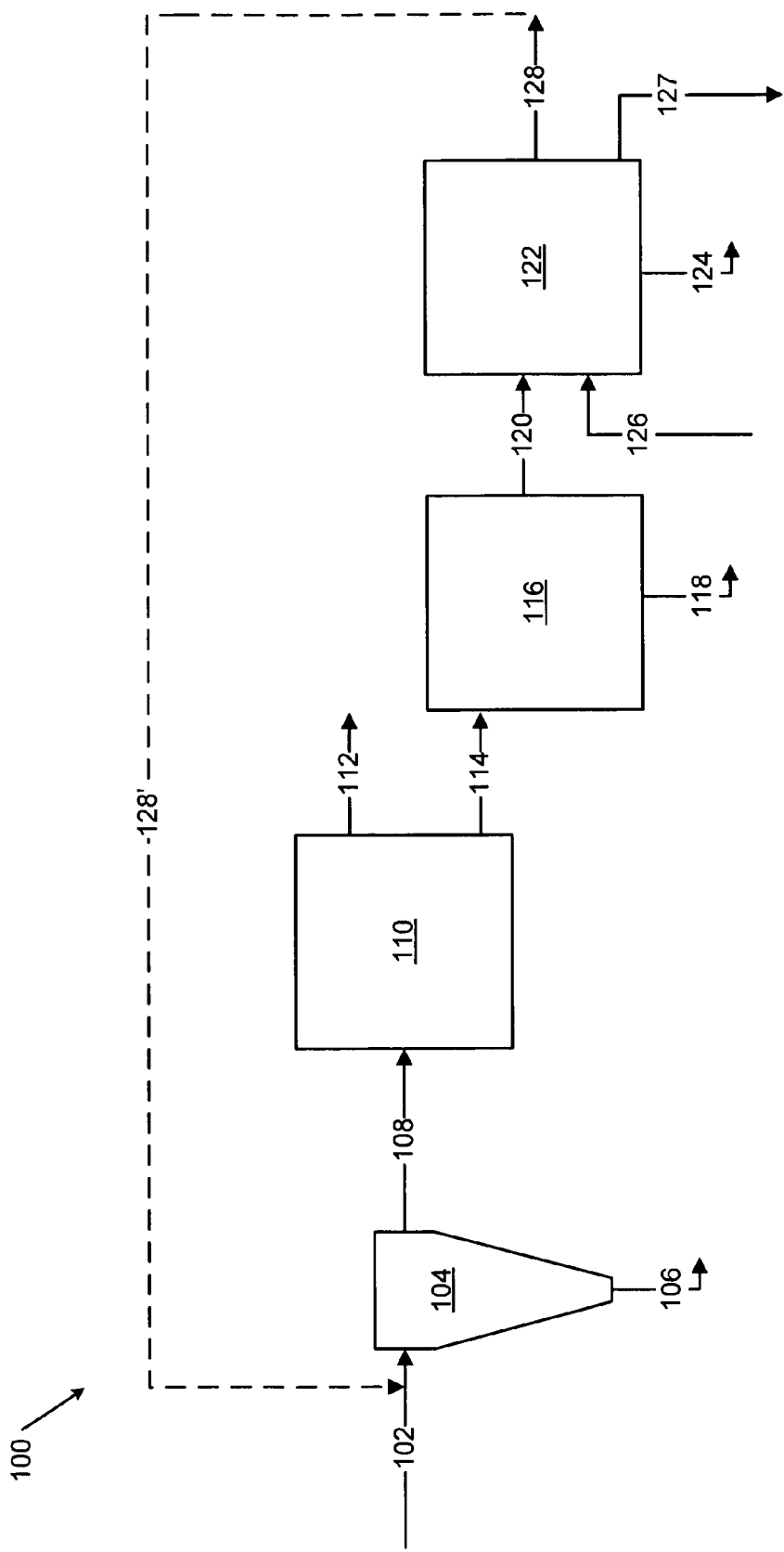
FIGS. 2 through 4 each illustrate process flow diagrams indicating how processes of the current disclosure may be performed.

FIG. 2 shows a system 100 for use in some embodiments. In the system 100, an offgas 102 enters a particle separator 104, in which particulate matter 106 is separated from an intermediate stream 108. The particle separator 104 may be any device operable to separate particulate matter from gases. For example, the particle separator 104 may be a cyclone, a scrubber, an elutriator, a filter, an electrostatic precipitator, a bag house, etc., or any combination thereof. In some embodiments, the particle separator 104 may include a scrubber, such as described in U.S. Pat. No. 3,634,999, issued Jan. 18, 1972, and entitled "Method for Recovering Dust Produced in Sodium Carbonate Manufacture."

The intermediate stream 108 leaving the particle separator 104 may be gaseous, and may be substantially free of solids. For example, the intermediate stream 108 may include less than about 1%, less than about 0.1%, or even less than about 0.05% solids by mass. The particle separator 104 may include two or more devices operated in series or parallel to provide any selected purity (i.e., absence of solids) of the intermediate stream 108.

In the system 100, the intermediate stream 108 passes from the particle separator 104 to a gas separator 110. The gas separator 110 separates the intermediate stream 108 into a gaseous waste 112 and a carbon oxide feedstock 114. The carbon oxide feedstock 114 may include CO, $CO_2$, and/or condensable gases (e.g., water vapor), and the gaseous waste 112 may include one or more other gases present in the intermediate stream 108. For example, the gaseous waste 112 may include oxygen, nitrogen, argon, etc. The gas separator 110 may include a membrane (e.g., a ceramic membrane, an organic membrane, etc.), an amine absorption system, a cryogenic separation system, a pressure-swing absorption system, or any other gas separation device or combination thereof. The gas separator 110 may be selected to separate particular gases, and may include two or more devices operated in series or parallel to provide any selected purity (i.e., concentration of CO or $CO_2$) of the carbon oxide feedstock 114. The gaseous waste 112 may be further purified for other uses or vented to the atmosphere. The gas separator 110 may produce a carbon oxide feedstock 114 consisting predominantly or essentially of CO and $CO_2$. The gas separator 110 may be designed to remove constituents known to poison the catalysts used in subsequent steps to levels below which the poisoning will occur, or to levels at which the catalyst has an acceptable service life. For example, the carbon oxide feedstock 114 may include at least 90% CO and $CO_2$, at least 95% CO and $CO_2$, or even at least 98% CO and $CO_2$.

In the system 100, the carbon oxide feedstock 114 passes from the gas separator 110 to a condenser 116. The condenser 116 separates the carbon oxide feedstock 114 into a condensate 118 and a dried carbon oxide feedstock 120. The condensate 118 may include water or another condensable gas. Removal of the condensate 118 may limit or prevent fouling or poisoning of catalysts, corrosion of equipment, or contamination of products in subsequent operations. The condenser 116 may include two or more devices operated in series or parallel to provide any selected dryness (i.e., absence of condensable vapors) of the dried carbon oxide feedstock 120. For example, the dried carbon oxide feedstock 120 may have a dew point of less than about 20° C., less than about 0° C., or even less than about −50° C. The condensate 118 may be further purified, used in other operations, or transferred to a disposal site.

In the system 100, the dried carbon oxide feedstock 120 passes from the condenser 116 to a reactor 122. The reactor 122 may catalytically convert CO and/or $CO_2$ in the dried carbon oxide feedstock 120 to at least one solid carbon product 124, which may be separated from the catalyst and reaction gases in a separation unit associated with the reactor 122, such as a cyclone. A reducing agent 126 may be added to the reactor 122 to promote one or more reactions, including Bosch reactions. For example, the reducing agent 126 may include a hydrocarbon, including alkanes such as $CH_4$, $H_2$, alcohols, or any mixture thereof. One or more condensates 127 may form within or near the reactor 122, such as in a separate condenser unit. Gases 128 leaving the reactor 122 may include one or more byproducts of the catalytic conversion, unreacted dried carbon oxide feedstock 120, and/or unreacted reducing agent 126. A portion 128' of the gases 128 may be recycled within the system 100, such as to the particle separator 104, into the intermediate stream 108, into the dried carbon oxide feedstock 120, or within the reactor 122. Some of the gases 128 may be further purified, used in other operations, or vented to the atmosphere.

The system 100 may include one or more compressors configured to provide materials at selected pressures (e.g., a compressor may compress the offgas 102 or the reducing agent 126). In some embodiments, the reactions occur in a single reaction zone. In other embodiments, the reactor 122 may include two or more devices operated in series or parallel to provide a selected conversion (i.e., fraction of carbon converted to the solid carbon product 124). Furthermore, the reactor 122 may recycle a portion of the gases stream 128 within the reactor 122 itself.

Figure 3:
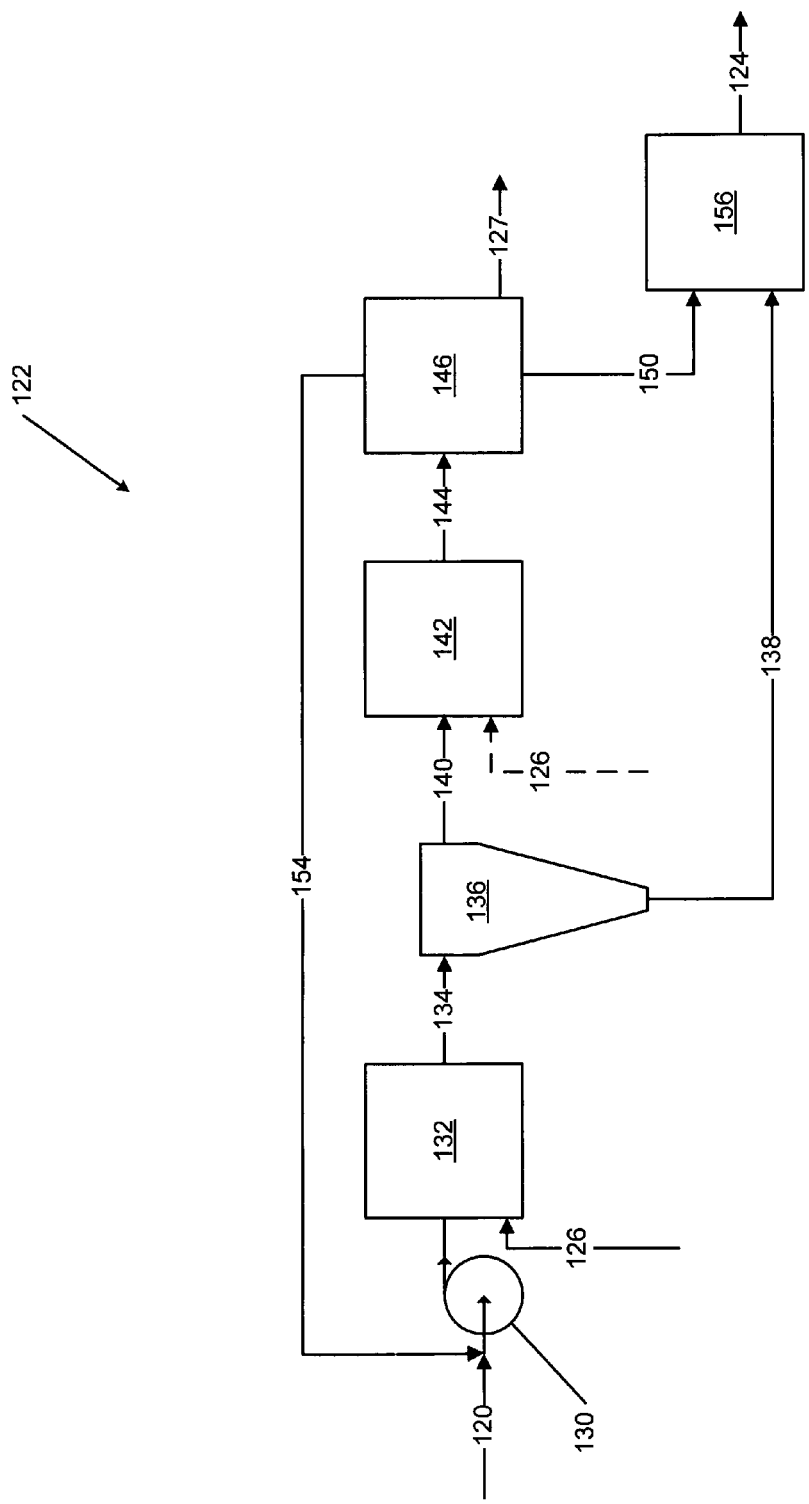

FIG. 3 illustrates a reactor 122 having multiple catalytic stages or zones for use in some embodiments. The reactor 122 includes a compressor 130. The compressor 130 may be configured to provide the dried carbon oxide feedstock 120, and, optionally, a gas recycle 154 at a pressure sufficient to drive the flow of the materials through subsequent stages of the reactor 122. The reactor 122 may include one or more valves, chambers, etc., configured to combine the dried carbon oxide feedstock 120, and the gas recycle 154. FIG. 3 shows the carbon oxide feedstock 120 and the gas recycle 154 combining before entering the compressor 130, but the carbon oxide feedstock 120 and the gas recycle 154 may be combined or mixed at other locations. In some embodiments, each of the carbon oxide feedstock 120 and the gas recycle 154 pass through distinct compressors 130.

The carbon oxide feedstock 120 and the gas recycle 154 may enter a first reaction zone 132 (e.g., a first stage of a reactor). The first reaction zone 132 may be adapted to provide conditions in which methane, supplied as reducing agent 126 and at least a portion of the carbon dioxide in carbon oxide feedstock 120 and/or the gas recycle 154 may be converted into CO, $CO_2$, and $H_2$, such as through the methane-reforming reactions (Equations 4 and 5). The first reaction zone 132 may be any vessel or portion thereof configured to contain, mix, or react the carbon oxide feedstock 120 or the gas recycle 154. For example, the first reaction zone 132 may be a fluidized bed. The first reaction zone 132 may include appropriate means for material handling, mixing, controlling temperature, controlling pressure, etc.

A first intermediate mixture 134 forms in the first reaction zone 132. The first intermediate mixture 134 may include $CO_2$, CO, $CH_4$, or $H_2$. Depending on the conditions of the first reaction zone 132, Bosch reactions may also occur within the first reaction zone 132, converting a portion of the carbon oxides and hydrogen into solid carbon, such as graphite (e.g., pyrolytic graphite), graphene, carbon black, fibrous carbon, buckminsterfullerene, single-wall CNTs, multi-wall CNTs, platelets, and/or nanodiamond. If methane-reforming reactions and Bosch reactions both occur in the first reaction zone 132, the first intermediate mixture 134 exiting the first reaction zone 132 may contain solid carbon and reaction gases. The type of solid carbon formed depends on various reaction conditions, such as temperatures, pressures, flow rates, reactant compositions, etc. In the reactor 122 shown in FIG. 3, the first intermediate mixture 134 enters a first separator 136 for separation of solids from gases. The first separator 136 may include any apparatus or process for separating solids from gases, such as a cyclone, a filter, etc. The first separator 136 divides the first intermediate mixture 134 into a solid carbon product 138 and a gaseous product 140. In other embodiments, the first reaction zone 132 and the first separator 136 are integrated into a single unit (i.e., the solid carbon product 138 may be separated from the gaseous product 140 as the solid carbon product 138 forms).

The gaseous product 140 passes to a second reaction zone 142 (e.g., a second stage of a reactor), which may be configured to promote conversion of CO and $CO_2$ into solid carbon and water, such as in Bosch Reactions (e.g., Equations 2 and 3). The reducing agent 126 may also be added to the second reaction zone 142. For example, the reducing agent 126 may be mixed with the gaseous product 140 before the gaseous product 140 enters the second reaction zone 142. In some embodiments, the reducing agent 126 and the gaseous product 140 may mix within the second reaction zone 142. The second reaction zone 142 may be any vessel or portion thereof configured to contain, mix, or react the gaseous product 140 or the reducing agent 126. For example, the second reaction zone 142 may be a fluidized bed. The second reaction zone 142 may include appropriate means for material handling, mixing, controlling temperature, controlling pressure, etc. In some embodiments, the second reaction zone 142 and the first reaction zone 132 are within a single body.

A second intermediate mixture 144 formed in the second reaction zone 142 may include water, $CO_2$, CO, $CH_4$, $H_2$, or solid carbon, such as graphite, pyrolytic graphite, graphene, carbon black, coke, fibrous carbon, buckminsterfullerene, single-wall CNTs, multi-wall CNTs, platelets, and nanodiamond. The type of solid carbon formed depends on various reaction conditions, such as temperatures, pressures, flow rates, reactant concentrations, product concentrations, etc.

The second intermediate mixture 144 includes products of the reaction of the gaseous product 140 and the reducing agent 126, and may include one or more of the reactants. In some embodiments, the carbon oxide of the gaseous product 140 and the reducing agent 126 react substantially to completion in the second reaction zone 142, consuming one or both of the carbon oxide and the reducing agent 126. For example, the carbon oxide may be provided in excess, and the reducing agent 126 may be substantially or entirely consumed stoichiometrically in the second reaction zone 142. In such embodiments, the second intermediate mixture 144 includes products (e.g., CO and $H_2O$) and a portion of the carbon oxide of the gaseous product 140. The second intermediate mixture 144 leaving the second reaction zone 142 may be substantially free of the reducing agent 126. In some embodiments, such as those adapted for CNT production, the reducing agent 126 may be provided substantially in excess to the carbon oxides, so that the carbon oxides may be substantially or entirely consumed stoichiometrically in the second reaction zone 142. The second intermediate mixture 144 leaving the second reaction zone 142 may therefore be substantially free of carbon oxides.

In the reactor 122 shown in FIG. 3, the second intermediate mixture 144 enters a second separator 146. The second separator 146 separates the second intermediate mixture 144 into two or more components. For example, the second separator 146 may separate the second intermediate mixture 144 into a solid carbon product 150, the condensate 127, and the gas recycle 154. The second separator 146 may include, for example, a condenser configured to separate the condensate 127 from the gas recycle 154, a cyclone configured to separate the solid carbon product 150 from the gas recycle 154, etc. The second separator 146 may include two or more devices operated in series or parallel to provide any selected purity (e.g., concentration, dryness, etc.) of the products. In some embodiments, the second reaction zone 142 and the second separator 146 may be integrated into a single unit (e.g., the solid carbon product 150 may be separated from the gas recycle 154 and the condensate 127 as the solid carbon product 150 forms).

The separated components may be individually purified, used in other operations, or disposed of. For example, the gas recycle 154 or a portion thereof may be combined with the carbon oxide feedstock 120 to recover unreacted reducing agent, unreacted CO, unreacted $CO_2$, or any remaining solid carbon from the gas recycle 154. In some embodiments, the gas recycle 154 or a portion thereof is combined with the gaseous product 140 entering the second reaction zone 142. In certain embodiments, the gas recycle 154 or a portion thereof is vented to the atmosphere. The condensate 127 may include water or other condensable materials. In some embodiments, the condensate 127 is processed as wastewater, cooling water, process water, potable water, etc.

The solid carbon products 138, 150 may include the same or different morphologies. In some embodiments, the solid carbon products 138, 150 are combined in a mixing vessel 156 to form a single solid carbon product 124. In other embodiments, the mixing vessel 156 may be configured to transform the solid carbon products 138, 150 into a final article of manufacture through one or more additional processing steps. In such embodiments, the solid carbon products 138, 150 may be mixed together with other constituents in the mixing vessel 156. The solid carbon products 138, 150 may be formed into objects suitable for recycle to the process that produced the offgas stream. For example, the solid carbon products 138, 150 may be manufactured into carbon anodes or other standard shapes for use in smelting processes. In other embodiments, the solid carbon products 138, 150 may be mixed with other products to form a final article of manufacture, such as a carbon-nanotube enhanced Portland cement, or a metal-matrix composite. In yet other embodiments, the solid carbon products 138, 150 may be separately sold, used in other operations, or disposed of.

In some embodiments, the first reaction zone 132 and the second reaction zone 142 are connected in a different order than shown in FIG. 3. For example, a carbon oxide feedstock 120 may enter a second reaction zone 142 with a reducing agent 126, and the second reaction zone 142 may be configured to promote conversion of CO and $CO_2$ into solid carbon and water, such as in Bosch reactions (e.g., Equations 2 and 3). In such embodiments, the products are separated (e.g., in a second separator 146), and a gaseous portion passes to the first reaction zone 132. The first reaction zone 132 may be adapted to provide conditions in which methane and carbon dioxide are converted into carbon monoxide and hydrogen, such as through methane-reforming reactions (e.g., Equation 4).

In certain embodiments, reactions occur in more than two reaction zones. For example, the embodiment shown in FIG. 3 may be modified such that the gas recycle 154 passes through a third reaction zone before returning to the first reaction zone 132 or instead of returning to the first reaction zone 132. The third reaction zone may be configured similar to the first reaction zone 132 (e.g., to promote the methane-reforming reaction) or the second reaction zone 142 (e.g., to promote Bosch reactions), may be adapted to promote the conversion of carbon monoxide to solid carbon and carbon dioxide through the Boudouard reaction, or may adapted to promote any other reaction.

In some embodiments, the first reaction zone 132 and the second reaction zone 142 operate in parallel (i.e., on a carbon oxide feedstock split into two or more streams). For example, a carbon oxide feedstock may be separated into a $CO_2$-rich component and a CO-rich component. The $CO_2$-rich component enters the second reaction zone 142, and the CO-rich component enters the first reaction zone 132. Product streams may pass from one zone to another as necessary or desirable to produce selected solid carbon products.

Figure 4:
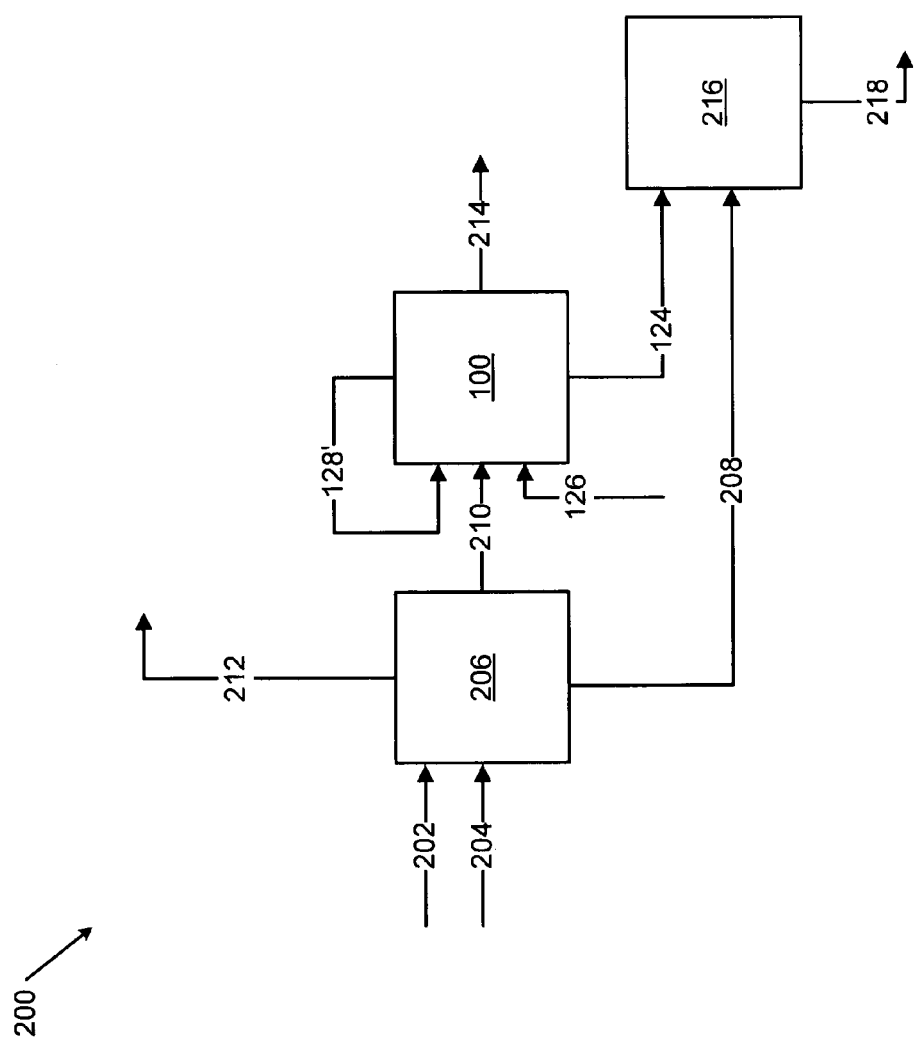

FIG. 4 illustrates a calcining system 200 that includes the system 100 shown in FIG. 2 (including the reactor 122 shown in FIG. 3). The calcining system 200 is configured to produce cement (e.g., Portland cement) or ingredients thereof. For example, limestone 202 may be mixed with other materials 204 and heated in a calciner (or kiln) 206. Solids 208 produced in the calciner 206 may be referred to in the art as "clinker," and may be further processed (e.g., ground, mixed with another material, etc.) to form cement, such as cement based on calcium silicates. A calciner offgas 210, which may include gases and dust, is also formed in the calciner 206. The calciner offgas 210, or a portion thereof, is transferred to the system 100 for treatment, as described above and shown in FIG. 2. In some embodiments, a portion 212 of the calciner offgas 210 is separated for additional treatment or disposal (e.g., venting). The system 100 is operable to treat the calciner offgas 210 and form the solid carbon product 124. A purge material 214 (e.g., a solids purge, a liquid purge, or a gaseous purge) may be removed from the system 100 to maintain material balance.

In some embodiments, the calciner offgas 210 is processed to remove one or more gases. For example, gases present in the calciner offgas 210 react before or within the system 100. Some gases, such as oxygen, are detrimental to some catalysts. For example, the presence of oxygen may poison a catalyst, such as by reacting with materials to form solids that adhere to or deposit on catalyst surfaces. To prevent such damage, oxygen may be removed or reacted with another material before entering a catalytic converter. For example, oxygen may be removed by contacting the calciner offgas 210 with a ceramic configured to allow oxygen to pass through the ceramic (e.g., a ceramic doped with an oxide of Zr, Ca, Mg, Y, V, Nb, Ta, Cr, Mo, Mn, Fe, W, and/or Ti), as described in U.S. Pat. No. 5,624,542, issued Apr. 29, 1997, and entitled "Enhancement of Mechanical Properties of Ceramic Membranes and Solid Electrolytes;" U.S. Pat. No. 5,910,238, issued Jun. 8, 1999, and entitled "Microspheres for Combined Oxygen Separation, Storage and Delivery;" or U.S. Pat. No. 5,021,137, issued Jun. 4, 1991, and entitled "Ceramic Solid Electrolyte Based Electrochemical Oxygen Concentrator Cell." In some embodiments, oxygen reacts with another material before the calciner offgas 210 enters the system 100. Such reaction may occur within the calciner 206, at an exit from the calciner 206, or within the system 100. For example, the reaction of oxygen may occur after separation of particulate matter 106 in the particle separator 104 (FIG. 2). It may be advantageous to react oxygen in or near the calciner 206 to take advantage of the high temperature of the calciner offgas 210.

In some embodiments, oxygen reacts with a reducing gas. For example, the reducing gas may include $H_2$, a hydrocarbon such as $CH_4$, another hydrocarbon, a synthesis gas, or any mixture thereof. The reducing gas may optionally be of the same composition as the reducing agent 126 shown in FIGS. 2 and 3 and discussed above. In some embodiments, the reducing gas is mixed with the calciner offgas 210. The mixture is passed over a catalyst selected to promote the reaction of oxygen with the reducing gas. In some embodiments, a catalyst is omitted, yet the oxygen nonetheless reacts with the reducing gas (e.g., the reducing gas may burn). The reducing gas may be provided in excess to consume substantially all the oxygen. Excess reducing gas may be consumed within the system 100 (e.g., within the reactor 122 (FIG. 2)). The reaction of oxygen with the reducing gas may produce, for example, carbon monoxide, carbon dioxide, water, etc.

In some embodiments, gases are separated from a carbon oxide feedstock 120, such as by membrane filtration, gas centrifuge separation, refrigeration, condensation, etc., such as by methods described in U.S. Pat. No. 3,905,784, issued Sep. 16, 1975, and entitled "Method for Removing Pollutants from Combustion Products Generated by Hydrocarbon Fuel Combustion, and System Therefor; " U.S. Pat. No. 4,602,477, issued Jul. 29, 1986, and entitled "Membrane-Aided Distillation for Carbon Dioxide and Hydrocarbon Separation; " and U.S. Pat. No. 5,133,190, issued Jul. 28, 1992, and entitled "Method and Apparatus for Flue Gas Cleaning by Separation and Liquefaction of Sulfur Dioxide and Carbon Dioxide." For example, gases such as sulfur dioxide ($SO_2$) and oxides of nitrogen (NO, $NO_2$, $N_2O_5$, etc.) may be removed to prevent poisoning of catalysts.

In the calcining system 200 shown in FIG. 4, a portion of the solids 208 produced in the calciner 206 is mixed in a mixing vessel 216 with a portion of the solid carbon product 124 produced in the system 100. In other words, a portion of the solid carbon product 124 is a component of a cement product 218. The properties of the cement product 218 may vary based on the amount and type of the solid carbon product 124 added to the solids 208.

Figure 5:
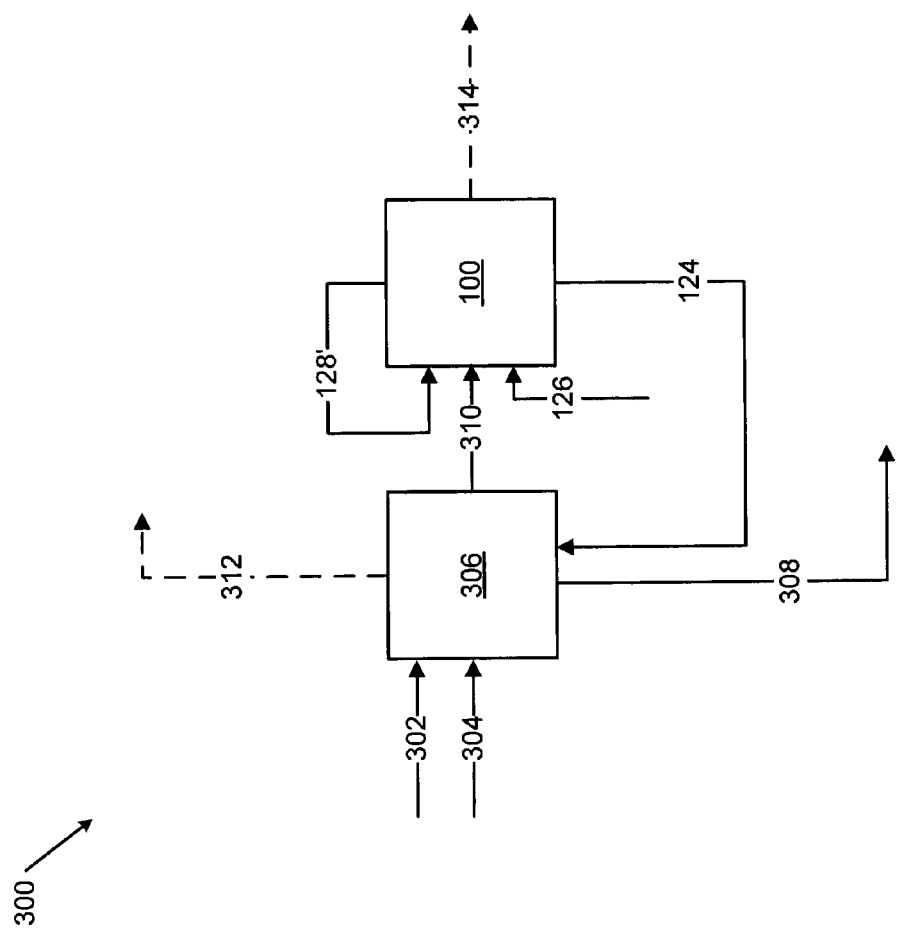
FIGS. 5 and 6 each illustrate process flow diagrams indicating how processes of the current disclosure may be performed, and how the resulting solid carbon product may be reused in the source process of the carbon oxide offgas stream.

FIG. 5 illustrates a carbon recovery system 300 in which solid carbon is recycled to become a component of a final product. Feed materials 302, 304 enter a unit operation 306, which may be any step or combination of steps in an industrial process. For example, the unit operation 306 may include fluid-flow processes, heat-transfer processes, mass-transfer processes, thermodynamic processes, or mechanical processes. In certain embodiments, the unit operation 306 includes a process for production of cement, aluminum alloys, or steel. The unit operation 306 may be any process or combination of processes, such as a Portland cement calciner or an aluminum or steel smelting plant. The unit operation 306 generates one or more material outputs, such as a solid product 308, an offgas 310, and optionally, a vent gas 312. The offgas 310 may be processed in the system 100 (including the reactor 122 shown in FIG. 3) to form the solid carbon product 124 and optionally, a purge material 314. The solid carbon product 124 (e.g., CNTs) is recycled to the unit operation 306, and may be combined with the feed materials 302, 304 or with other intermediate materials to form the solid product 308.

The carbon recovery system 300 may be used to form any product in which solid carbon products 124 may be a beneficial ingredient or additive. For example, if the solid carbon product includes CNTs, the solid product 308 may be a material that may be strengthened by CNTs (e.g., cement, metal alloys, metal matrix composites, etc.). By coupling the system 100 for solid carbon production with the unit operation 306, production efficiencies may be realized, such as the avoidance of transportation costs, energy recovery, intermediate product-quality control, etc.

In the carbon recovery system 300, the solid carbon product 124 is mixed within a unit operation 306 (e.g., prior to final forming, packaging, and shipping). In other embodiments, the solid carbon product 124 may be mixed with the solid product 308 after the solid product 308 leaves the unit operation 306. Carbon oxides 310 from the unit operation 306 are captured, cleaned, or purified in the system 100 for solid carbon production and are used as a feedstock for the unit operation 306. The solid carbon product 124 formed in the system 100 is added to the solid product 308 as a value-added constituent of the solid product 308.

Figure 6:
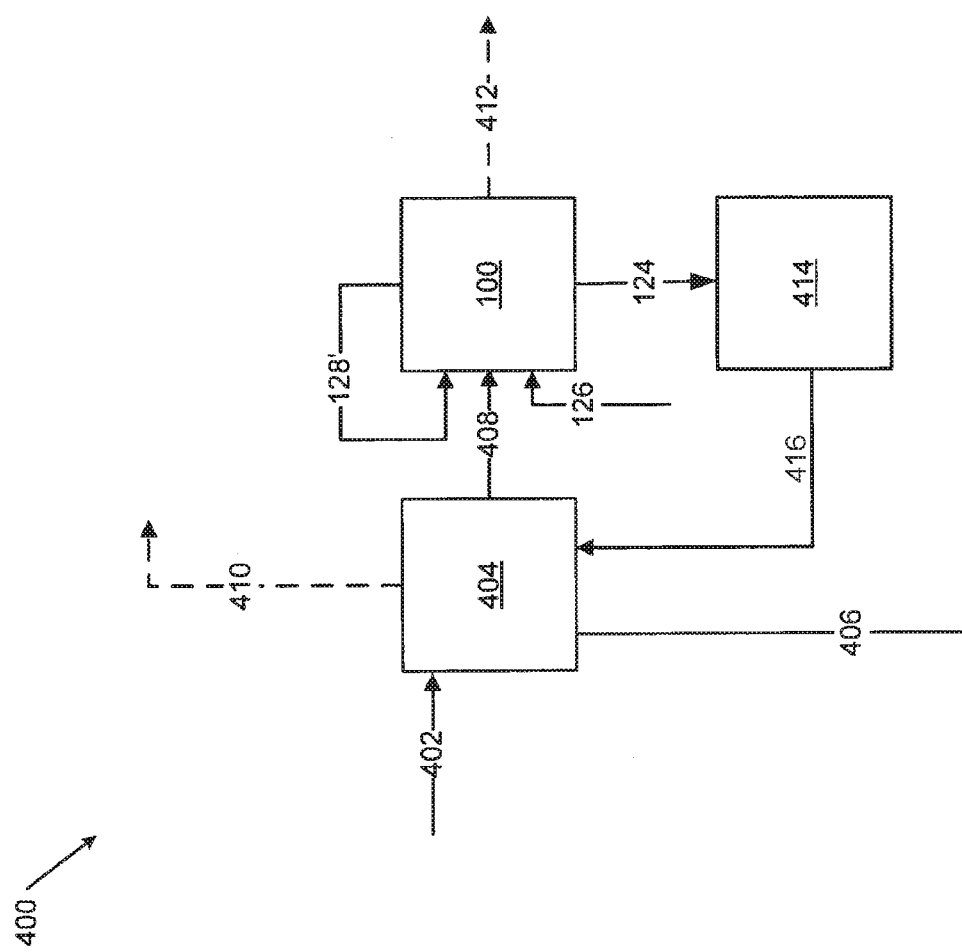

FIG. 6 illustrates another carbon recovery system 400 in which solid carbon formed in the system 100 is further processed to become a reactant for an industrial process. Feed material 402 enters a unit operation 404, which may be any step or combination of steps in an industrial process. For example, the unit operation 404 may be an aluminum smelter having a carbon anode and a cathode. The unit operation 404 generates one or more material outputs, such as a solid product 406, an offgas 408, and optionally, a vent gas 410. The offgas 408 may be processed in the system 100 (including the reactor 122 shown in FIG. 3) to form the solid carbon product 124 and optionally, a purge material 412. The solid carbon product 124 enters another unit operation 414, where it is further processed to form a recycle feedstock 416. The recycle feedstock 416 may be any feedstock useful in the unit operation 404. For example, if the unit operation 404 is an aluminum smelter having a carbon anode, the recycle feedstock 416 may be carbon anodes. That is, the unit operation 414 may be a fabrication process in which the solid carbon product 124 is mixed with other ingredients, extruded, cured, and sintered to form anodes. In such embodiments, the fabrication process may include other material inputs (e.g., anode butts from the smelting process, petroleum coke, pitch, etc.).

Thus, the carbon recovery system 400 may recycle carbon within the carbon recovery system 400, rather than adding solid carbon (e.g., solid carbon purchased from an outside vendor) and venting carbon oxides. By coupling the system 100 for solid carbon production with the unit operation 404, production efficiencies may be realized, such as the avoidance of transportation costs, energy recovery, intermediate product quality control, etc.

In any of the operations shown in the figures and described herein, controllers may be configured to maintain selected conditions, as indicated by signals received from one or more sensors. For example, the system 100 may include appropriate means for material handling, mixing, controlling temperature, controlling pressure, etc.

Components and zones of the systems shown and described herein operate at various temperatures. For example, one or both of the first reaction zone 132 or the second reaction zone 142 may operate at a temperature of at least 450° C., such as a temperature of at least 650° C., or a temperature of from about 680° C. to about 700° C. The first separator 136, the second separator 146, or the mixing vessel 156 may operate at lower temperatures than the first reaction zone 132 or the second reaction zone 142. For example, the first separator 136, the second separator 146, or the mixing vessel 156 may operate at temperatures of less than about 100° C., less than about 80° C., or even less than about 50° C. In some embodiments, heat may be recovered from one material and transferred to another. Exemplary heat recovery systems are described in U.S. Pat. No. 4,126,000, issued Nov. 21, 1978, and entitled "System for Treating and Recovering Energy from Exhaust Gases."

Use of solid carbon products in cement products may provide improvements in various properties of the cement products. For example, CNTs may increase the tensile strength of concrete formed from such a cement product. Graphite or another solid carbon product may serve as a colorant for cement products, and may be beneficial for aesthetic or functional reasons (e.g., heat absorption, tensile strength). Solid carbon products may affect other properties of cement products, such as density, cure time, particle-size distribution, propensity to form dust, etc.

Use of solid carbon products in metal products may provide improvements in various properties of the metal products. For example, CNTs may increase tensile strength of metal products. Solid carbon products may affect other properties of metals, such as density, creep resistance, heat transfer, etc. An offgas may include a large concentration of particulate matter, CO or $CO_2$, as well as other gases, such as $SO_x$, $NO_x$, $N_2$, $O_2$, water vapor, etc. Filtration of the particulate matter or processing as disclosed herein may lessen environmental impacts of cement production. Furthermore, the conversion of carbon oxides into solid carbon products provides a means for carbon sequestration, decreasing the amount of carbon oxides released to the atmosphere. In addition to avoiding the costs of disposal (e.g., regulatory fees, purification, etc.), such conversion may provide a valuable product for sale or use in other products.

The use of multiple reaction zones, as shown and described in FIG. 3, provides a means to process the offgas of a calciner used in cement production. Because the methane-reforming reaction consumes methane and carbon dioxide, it may be beneficial to react carbon dioxide in the offgas to produce hydrogen and CO. Furthermore, the use of multiple reaction zones may allow multiple types or grades of solid carbon products to be formed simultaneously. The reaction conditions of each zone may be varied as market conditions change, allowing an improved ability to produce high-demand products.

EXAMPLES

For Examples 1 through 7, below, carbon steel coupons were cut from a sheet of steel having a thickness of about 1.3 mm. Each coupon was approximately 13 mm wide and approximately 18 mm to 22 mm long. Coupons were separately placed in quartz boats about 8.5 cm long and 1.5 cm wide, and the boats were inserted end-to-end into a quartz tube having an inner diameter of about 2.54 cm and a length of about 1.2 m. The quartz tube was then placed in a tube furnace. The quartz tube was purged with hydrogen gas to reduce the surfaces of the coupons before the tube furnace was heated to operating conditions. After the tube furnace reached operating conditions, reaction gases were introduced into the quartz tube (i.e., flowed continuously through the quartz tube) such that both the upper and lower surfaces of each coupon were exposed to reaction gas. The temperature, pressure, and gas composition were measured at each coupon. After the test, the coupons were removed from the quartz tube. Weight changes and carbon formation were noted.

Example 1

Twelve steel coupons were placed in a quartz tube as described above. A reaction gas containing about 25% $H_2$, 25% CO, 25% $CO_2$, and 25% $CH_4$ was introduced into the quartz tube at about 4.0 MPa. The gases flowed over the coupons for about 4 hours at 2000 sccm (standard cubic centimeters per minute). Solid carbon formed on eight of the twelve coupons at temperatures between about 650° C. and about 870° C., as shown in Table 1 below. After the test, solid carbon was physically removed from some of the coupons and tested for BET specific surface area, as shown in Table 1. About 41.2 grams of water was collected from the gases during the test.

TABLE 1

| Solid Carbon Formation from 25% $H_2$, 25% CO, 25% $CO_2$, and 25% $CH_4$ | | | | | | |
|---|---|---|---|---|---|---|
| Sample # | 1 | 2 | 3 | 4 | 5 | 6 |
| Distance from inlet (cm) | 13 | 22 | 30.7 | 40.4 | 48.8 | 59.2 |
| Temperature (° C.) | 358.4 | 563.3 | 649.4 | 701.5 | 721.4 | 749.9 |
| $H_2$ composition (%) | | | 23.7 | | 22.6 | 21.9 |
| $CH_4$ composition (%) | | | 24.9 | | 24.4 | 24.1 |
| $CO_2$ composition (%) | | | 23.0 | | 21.4 | 20.5 |
| CO composition (%) | | | 26.1 | | 27.2 | 27.9 |
| $H_2O$ composition (%) | | | 2.39 | | 4.46 | 5.67 |
| Deposition rate (g/cm²/hr) | 0.000 | 0.000 | 0.058 | 0.043 | 0.047 | 0.109 |
| Surface Area (m²/g) | | | 249.5 | 178.7 | 141.3 | |
| Sample # | 7 | 8 | 9 | 10 | 11 | 12 |
| Distance from inlet (cm) | 68.3 | 77.0 | 85.6 | 94.5 | 103 | 112 |
| Temperature (° C.) | 773.4 | 802.5 | 842.0 | 892.2 | 868.8 | 548.4 |
| $H_2$ composition (%) | 21.3 | 20.8 | 20.2 | | 19.2 | |
| $CH_4$ composition (%) | 23.9 | 23.6 | 23.4 | | 22.9 | |
| $CO_2$ composition (%) | 19.6 | 18.9 | 18.1 | | 16.5 | |
| CO composition (%) | 28.5 | 29.0 | 29.6 | | 30.7 | |
| $H_2O$ composition (%) | 6.71 | 7.70 | 8.71 | | 10.7 | |
| Deposition rate (g/cm²/hr) | 0.116 | 0.107 | 0.085 | 0.000 | 0.043 | 0.000 |
| Surface Area (m²/g) | 110.4 | 97.5 | 97.5 | | 106.4 | |

Example 2

Twelve steel coupons were placed in a quartz tube as described above. A reaction gas containing about 50% CO and 50% $CO_2$ was introduced into the quartz tube at about 4.0 MPa. The gases flowed over the coupons for about three hours at 2000 sccm. Solid carbon formed on ten of the twelve coupons at temperatures between about 590° C. and about 900° C., as shown in Table 2 below. After the test, solid carbon was physically removed from some of the coupons and tested for BET specific surface area, as shown in Table 2. No water was collected from the gases during the test.

TABLE 2

| Solid Carbon Formation from 50% CO and 50% $CO_2$ | | | | | | |
|---|---|---|---|---|---|---|
| Sample # | 1 | 2 | 3 | 4 | 5 | 6 |
| Distance from inlet (cm) | 14 | 23 | 31.5 | 40.9 | 51.0 | 59.4 |
| Temperature (° C.) | 413.9 | 589.1 | 631.2 | 666.7 | 701.1 | 738.2 |
| $H_2$ composition (%) | | 0.39 | 0.39 | 0.40 | 0.40 | 0.40 |
| $CO_2$ composition (%) | | 49.7 | 49.7 | 49.6 | 49.6 | 49.5 |
| CO composition (%) | | 49.9 | 49.9 | 50.0 | 50.0 | 50.1 |
| Deposition rate (g/cm$^2$/hr) | 0.000 | 0.011 | 0.011 | 0.007 | 0.014 | 0.009 |
| Surface Area (m$^2$/g) | | 43.9 | 78.5 | | 27.4 | |
| Sample # | 7 | 8 | 9 | 10 | 11 | 12 |
| Distance from inlet (cm) | 68.3 | 77.2 | 86.1 | 94.2 | 103 | 112 |
| Temperature (° C.) | 785.5 | 844.2 | 897.8 | 891.0 | 825.0 | 523.5 |
| $H_2$ composition (%) | 0.40 | | 0.41 | | 0.42 | |
| $CO_2$ composition (%) | 49.5 | | 49.4 | | 49.3 | |
| CO composition (%) | 50.1 | | 50.2 | | 50.3 | |
| Deposition rate (g/cm$^2$/hr) | 0.003 | 0.006 | 0.009 | 0.009 | 0.005 | 0.000 |
| Surface Area (m$^2$/g) | | | | | | |

Example 3

Twelve steel coupons were placed in a quartz tube as described above. A reaction gas containing about 90% CO and 10% $CO_2$ was introduced into the quartz tube at about 4.0 MPa. The gases flowed over the coupons for about two hours at 2000 sccm. Solid carbon formed on ten of the twelve coupons at temperatures between about 590° C. and about 900° C., as shown in Table 3 below. After the test, solid carbon was physically removed from some of the coupons and tested for BET specific surface area, as shown in Table 3. No water was collected from the gases during the test.

Example 4

Twelve steel coupons were placed in a quartz tube as described above. A reaction gas containing about 90% CO and 10% $CO_2$ was introduced into the quartz tube at about 1.5 MPa. The gases flowed over the coupons for about three hours at 2000 sccm. Solid carbon formed on ten of the twelve coupons at temperatures between about 536° C. and about 890° C., as shown in Table 4 below. After the test, solid carbon was physically removed from some of the coupons and tested for BET specific surface area, as shown in Table 4. No water was collected from the gases during the test.

TABLE 3

| Solid Carbon Formation from 90% CO and 10% $CO_2$ | | | | | | |
|---|---|---|---|---|---|---|
| Sample # | 1 | 2 | 3 | 4 | 5 | 6 |
| Distance from inlet (cm) | 14 | 23 | 31.5 | 40.4 | 52.3 | 58.2 |
| Temperature (° C.) | 423.6 | 588.5 | 632.6 | 663.1 | 703.2 | 729.4 |
| $H_2$ composition (%) | | | 0.54 | 0.57 | 0.60 | 0.62 |
| $CO_2$ composition (%) | | | 11.6 | 12.3 | 13.4 | 13.9 |
| CO composition (%) | | | 87.9 | 87.1 | 86.0 | 85.5 |
| Deposition rate (g/cm$^2$/hr) | 0.000 | 0.001 | 0.083 | 0.118 | 0.064 | 0.066 |
| Surface Area (m$^2$/g) | | | 68.2 | 61.7 | 58.7 | 53.2 |
| Sample # | 7 | 8 | 9 | 10 | 11 | 12 |
| Distance from inlet (cm) | 68.8 | 78.5 | 88.4 | 92.5 | 103 | 113 |
| Temperature (° C.) | 789.4 | 857.1 | 902.4 | 898.7 | 829.0 | 499.3 |
| $H_2$ composition (%) | 0.65 | 0.68 | 0.71 | 0.72 | 0.42 | |
| $CO_2$ composition (%) | 14.9 | 15.8 | 16.7 | 18.2 | 49.3 | |
| CO composition (%) | 84.4 | 83.5 | 82.6 | 81.1 | 50.3 | |
| Deposition rate (g/cm$^2$/hr) | 0.030 | 0.019 | 0.005 | 0.005 | 0.027 | 0.000 |
| Surface Area (m$^2$/g) | 44.9 | | | | | |

TABLE 4

Solid Carbon Formation from 90% CO and 10% $CO_2$

| Sample # | 1 | 2 | 3 | 4 | 5 | 6 |
|---|---|---|---|---|---|---|
| Distance from inlet (cm) | 13 | 23 | 32.0 | 40.6 | 49.8 | 57.4 |
| Temperature (° C.) | 422.8 | 536.4 | 638.8 | 676.3 | 708.2 | 736.0 |
| $H_2$ composition (%) | | | 0.61 | 0.62 | 0.63 | 0.64 |
| $CO_2$ composition (%) | | | 9.56 | 9.75 | 9.96 | 10.1 |
| CO composition (%) | | | 89.8 | 89.6 | 89.4 | 89.2 |
| Deposition rate (g/cm²/hr) | 0.000 | 0.001 | 0.011 | 0.013 | 0.013 | 0.020 |
| Surface Area (m²/g) | | | | 53.2 | 50.4 | 44.0 |

| Sample # | 7 | 8 | 9 | 10 | 11 | 12 |
|---|---|---|---|---|---|---|
| Distance from inlet (cm) | 67.1 | 75.7 | 82.8 | 94.5 | 102 | 112 |
| Temperature (° C.) | 768.8 | 803.1 | 831.8 | 890.5 | 856.6 | 535.6 |
| $H_2$ composition (%) | 0.65 | 0.67 | 0.68 | | | |
| $CO_2$ composition (%) | 10.3 | 10.5 | 10.7 | | | |
| CO composition (%) | 89.0 | 88.8 | 88.6 | | | |
| Deposition rate (g/cm²/hr) | 0.015 | 0.009 | 0.001 | 0.001 | 0.002 | 0.000 |
| Surface Area (m²/g) | 38.7 | 31.5 | | | | |

Example 5

Twelve steel coupons were placed in a quartz tube as described above. A reaction gas containing about 13.0% $H_2$, 15.2% CO, 10.9% $CO_2$, 57.8% $CH_4$, and 3.0% Ar was introduced into the quartz tube at about 412 kPa. The gases flowed over the coupons for about six hours at 2000 sccm. Solid carbon formed on seven of the twelve coupons at temperatures between about 464° C. and about 700° C., as shown in Table 5 below. After the test, solid carbon was physically removed from some of the coupons and tested for BET specific surface area, as shown in Table 5. About 7.95 grams of water was collected from the gases during the test.

TABLE 5

Solid Carbon Formation from 13.0% $H_2$, 15.2% CO, 10.9% $CO_2$, 57.8% $CH_4$, and 3.0% Ar

| Sample # | 1 | 2 | 3 | 4 | 5 | 6 |
|---|---|---|---|---|---|---|
| Distance from inlet (cm) | 11 | 21 | 30.2 | 38.3 | 47.8 | 57.2 |
| Temperature (° C.) | 277.2 | 467.9 | 526.9 | 566.8 | 601.8 | 638.7 |
| $H_2$ composition (%) | | | 12.3 | | | |
| $CH_4$ composition (%) | | | 57.8 | | | |
| $CO_2$ composition (%) | | | 10.9 | | | |
| CO composition (%) | | | 15.1 | | | |
| $H_2O$ composition (%) | | | 0.87 | | | |
| Ar composition (%) | | | 3.16 | | | |
| Deposition rate (g/cm²/hr) | 0.000 | 0.000 | 0.016 | 0.019 | 0.009 | 0.007 |
| Surface Area (m²/g) | | | 189.5 | 245.9 | 228.9 | 142.7 |

| Sample # | 7 | 8 | 9 | 10 | 11 | 12 |
|---|---|---|---|---|---|---|
| Distance from inlet (cm) | 66.0 | 75.2 | 84.1 | 93.5 | 103 | 112 |
| Temperature (° C.) | 666.0 | 698.1 | 737.0 | 786.3 | 766.3 | 464.4 |
| $H_2$ composition (%) | | 11.5 | | | | 10.9 |
| $CH_4$ composition (%) | | 57.5 | | | | 57.2 |
| $CO_2$ composition (%) | | 10.1 | | | | 9.39 |
| CO composition (%) | | 14.9 | | | | 14.8 |
| $H_2O$ composition (%) | | 2.85 | | | | 4.49 |
| Ar composition (%) | | 3.18 | | | | 3.20 |
| Deposition rate (g/cm²/hr) | 0.010 | 0.002 | 0.000 | 0.000 | 0.000 | 0.005 |
| Surface Area (m²/g) | 96.7 | 66.7 | | | | 224.8 |

Example 6

Twelve steel coupons were placed in a quartz tube as described above. A reaction gas containing about 13.0% $H_2$, 15.2% CO, 13.0% $CO_2$, 55.8% $CH_4$, and 2.93% Ar was introduced into the quartz tube at about 412 kPa. The gases flowed over the coupons for about six hours at 2000 sccm. Solid carbon formed on seven of the twelve coupons at temperatures between about 536° C. and about 794° C., as shown in Table 6 below. After the test, solid carbon was physically removed from some of the coupons and tested for BET specific surface area, as shown in Table 6. About 7.38 grams of water was collected from the gases during the test.

TABLE 6

Solid Carbon Formation from 13.0% $H_2$, 15.2% CO, 13.0% $CO_2$, 55.8% $CH_4$, and 2.93% Ar

| Sample # | 1 | 2 | 3 | 4 | 5 | 6 |
|---|---|---|---|---|---|---|
| Distance from inlet (cm) | 14 | 23 | 31.5 | 39.6 | 48.5 | 59.2 |
| Temperature (° C.) | 335.8 | 482.4 | 536.9 | 574.6 | 607.4 | 645.4 |
| $H_2$ composition (%) | | | | 11.5 | 11.3 | 11.1 |
| $CH_4$ composition (%) | | | | 55.7 | 55.6 | 55.5 |
| $CO_2$ composition (%) | | | | 13.3 | 13.1 | 13.0 |
| CO composition (%) | | | | 15.2 | 15.3 | 15.4 |
| $H_2O$ composition (%) | | | | 1.24 | 1.62 | 2.07 |
| Ar composition (%) | | | | 3.04 | 3.06 | 3.07 |
| Deposition rate (g/cm²/hr) | 0.000 | 0.000 | 0.015 | 0.009 | 0.007 | 0.007 |
| Surface Area (m²/g) | | | 225.8 | 251.1 | 189.8 | 132.7 |

| Sample # | 7 | 8 | 9 | 10 | 11 | 12 |
|---|---|---|---|---|---|---|
| Distance from inlet (cm) | 68.6 | 77.2 | 85.9 | 95.3 | 104 | 113 |
| Temperature (° C.) | 673.4 | 704.6 | 744.3 | 794.1 | 752.9 | 438.7 |
| $H_2$ composition (%) | 10.8 | 10.6 | | | | |
| $CH_4$ composition (%) | 55.3 | 55.2 | | | | |
| $CO_2$ composition (%) | 12.8 | 12.7 | | | | |
| CO composition (%) | 15.5 | 15.6 | | | | |
| $H_2O$ composition (%) | 2.5 | 2.86 | | | | |
| Ar composition (%) | 3.08 | 3.10 | | | | |
| Deposition rate (g/cm²/hr) | 0.004 | 0.0003 | 0.000 | 0.0001 | 0.0001 | 0.0001 |
| Surface Area (m²/g) | 79.4 | | | | | |

Example 7

Twelve steel coupons were placed in a quartz tube as described above. A reaction gas containing about 15.2% $H_2$, 13.0% CO, 8.7% $CO_2$, 59.9% $CH_4$, and 3.15% Ar was introduced into the quartz tube at about 412 kPa. The gases flowed over the coupons for about six hours at 2000 sccm. Solid carbon formed on ten of the twelve coupons at temperatures between about 523° C. and about 789° C., as shown in Table 7 below. After the test, solid carbon was physically removed from some of the coupons and tested for BET specific surface area, as shown in Table 7. About 9.59 grams of water was collected from the gases during the test.

Prophetic Example 8

Hydrogen gas is mixed with carbon dioxide gas in a ratio of about 2.1:1 inside a first tube furnace lined with a ceramic material, maintained at about 680° C., and containing steel wool therein. The hydrogen gas reacts with the carbon dioxide gas in the presence of the steel wool to form single-wall carbon nanotubes and a residual gas mixture of carbon dioxide, carbon monoxide, water, and hydrogen. The residual gas mixture enters a condenser operating at about 50° C. to remove liquid water from the residual gas mixture. The dried residual gas mixture enters a second tube furnace lined with a ceramic material, maintained at about 680° C.,

TABLE 7

Solid Carbon Formation from 15.2% $H_2$, 13.0% CO, 8.7% $CO_2$, 59.9% $CH_4$, and 3.15% Ar

| Sample # | 1 | 2 | 3 | 4 | 5 | 6 |
|---|---|---|---|---|---|---|
| Distance from inlet (cm) | 11 | 20 | 30.2 | 39.1 | 48.0 | 56.9 |
| Temperature (° C.) | 262.5 | 466.7 | 523.6 | 568.8 | 603.8 | 638.1 |
| $H_2$ composition (%) | | | | 13.8 | 13.6 | 13.4 |
| $CH_4$ composition (%) | | | | 59.9 | 59.9 | 59.9 |
| $CO_2$ composition (%) | | | | 9.36 | 9.21 | 9.07 |
| CO composition (%) | | | | 13.0 | 13.0 | 13.1 |
| $H_2O$ composition (%) | | | | 0.90 | 1.17 | 1.45 |
| Ar composition (%) | | | | 3.15 | 3.15 | 3.16 |
| Deposition rate (g/cm²/hr) | 0.000 | 0.000 | 0.005 | 0.024 | 0.012 | 0.015 |
| Surface Area (m²/g) | | | 149.1 | 233.6 | 209.7 | 128.0 |

| Sample # | 7 | 8 | 9 | 10 | 11 | 12 |
|---|---|---|---|---|---|---|
| Distance from inlet (cm) | 65.5 | 74.7 | 84.6 | 92.7 | 102 | 111 |
| Temperature (° C.) | 664.0 | 695.1 | 736.5 | 781.3 | 788.8 | 553.2 |
| $H_2$ composition (%) | 13.2 | 13.1 | 12.9 | | | |
| $CH_4$ composition (%) | 59.2 | 59.8 | 59.8 | | | |
| $CO_2$ composition (%) | 8.93 | 8.78 | 8.62 | | | |
| CO composition (%) | 13.1 | 13.2 | 13.2 | | | |
| $H_2O$ composition (%) | 1.72 | 2.01 | 2.32 | | | |
| Ar composition (%) | 3.16 | 3.16 | 3.17 | | | |
| Deposition rate (g/cm²/hr) | 0.013 | 0.001 | 0.0002 | 0.00006 | 0.0001 | 0.008 |
| Surface Area (m²/g) | 76.9 | 77.3 | | | | 251.5 | and containing steel wool therein. The carbon dioxide, carbon monoxide, and hydrogen in the dried reaction gas mixture react in the presence of the steel wool to form single-wall carbon nanotubes and a tail gas mixture of water and hydrogen. The carbon nanotubes collect on surfaces of the steel wool. The tail gas mixture enters is recycled to the pre-concentrator. After the process has proceeded for a period of time, flow of gas is stopped, the furnaces and condenser are cooled to room temperature, and the system is purged with an inert gas. The steel wool is removed from the second tube furnace, and the carbon nanotubes are physically removed from the steel wool. Any remaining metal on the carbon nanotubes is removed by washing with acid.

Prophetic Example 9

Methane gas is mixed with carbon dioxide gas in a ratio of 1.2:1 inside a first tube furnace lined with a ceramic material, maintained at about 680° C., and containing steel wool therein. The methane gas reacts with the carbon dioxide gas in the presence of the steel wool to form single-wall carbon nanotubes and a residual gas mixture of carbon dioxide, carbon monoxide, methane, water, and hydrogen. The residual gas mixture enters a condenser operating at about 50° C. to remove liquid water from the residual gas mixture. The dried residual gas mixture enters a second tube furnace lined with a ceramic material, maintained at about 680° C., and containing steel wool therein. The carbon dioxide, carbon monoxide, methane, and hydrogen in the dried reaction gas mixture react in the presence of the steel wool to form single-wall carbon nanotubes and a tail gas mixture of water, methane, and hydrogen. The carbon nanotubes collect on surfaces of the steel wool. The tail gas mixture is recycled to the pre-concentrator. After the process has proceeded for a period of time, flow of gas is stopped, the furnaces and condenser are cooled to room temperature, and the system is purged with an inert gas. The steel wool is removed from the second tube furnace, and the carbon nanotubes are physically removed from the steel wool. Any remaining metal on the carbon nanotubes is removed by washing with acid.

Prophetic Example 10

An offgas enters a particle separator. The offgas passes through a cyclone to remove particulate matter, producing an intermediate stream containing less than 1% solid material. The particulate matter is passed to a bag house for collection and disposal. The intermediate stream enters a condenser operating at about 50° C. to remove liquid water from the residual gas mixture. The remaining dried carbon oxide feedstock passes from the condenser into a reactor maintained at about 680° C., where hydrogen is added as a reducing agent to promote Bosch reactions. The reactor contains solid catalyst nanoparticles or grains (e.g., nickel, molybdenum, chromium, cobalt, tungsten, iron, etc.). After the process has proceeded for a period of time, flow of gas is stopped, the furnaces and condenser are cooled to room temperature, and the system is purged with an inert gas. Solid carbon products are physically removed from the surface of the catalyst. The tail gas mixture is recycled to the particle separator stage.

Prophetic Example 11

An offgas from a cement kiln including carbon oxides is passed through a bag house to remove particulate matter, producing an intermediate stream containing less than 1% particulate matter. The intermediate stream is passed through a two-stage gas separator, wherein the intermediate stream is separated into a gaseous waste, including $SO_x$ and $NO_x$, and a carbon oxide feedstock. The gaseous waste is released, and the carbon oxide feedstock, comprising at least 95% CO and $CO_2$, passes into a condenser operating at about 50° C., where water vapor and other condensable gases are condensed and removed from the carbon oxide feedstock. The dried carbon oxide feedstock passes from the condenser to a reactor maintained at about 680° C. and 4.1 MPa, where it is mixed with methane and allowed to react in the presence of a nickel or iron catalyst. The reaction gases are allowed to pass into a cyclone separation unit, where solid carbon is removed. The tail gas is recycled back to the condenser.

The disclosure has several advantages over conventional methods. Although embodiments of the methods have been described, various modifications and changes may be made by those skilled in the art without departing from the spirit and scope of the disclosure.

What is claimed is:

1. A method of treating an offgas containing at least one carbon oxide gas, water vapor, and particulate matter to produce solid carbon from the carbon oxide gas, the method comprising:
    purifying an offgas from at least one of an aluminum smelter or a steel smelter to remove at least a portion of particulate matter therefrom to produce an intermediate stream;
    condensing water vapor from the intermediate stream to produce a dried carbon oxide feedstock gas;
    mixing at least one reducing gas with the carbon oxide feedstock gas to form a reaction gas mixture;
    converting at least a portion of the carbon in the reaction gas mixture to solid carbon and a tail gas stream containing water vapor; and
    recycling at least a portion of the solid carbon to the at least one of the aluminum smelter or the steel smelter to form the offgas and at least one of a metal matrix composite, electrodes for electric arc furnaces, carbon raisers, or high purity carbon reducing agents.

2. The method of claim 1, wherein recycling the at least a portion of the solid carbon to the at least one of the aluminum smelter or the steel smelter comprises processing the solid carbon to form a recycle feedstock suitable for a least one application in the at least one of the aluminum smelter or the steel smelter or as an additive to the product of the at least one of the aluminum smelter or the steel smelter.

3. The method of claim 2, wherein processing the solid carbon to form a recycle feedstock comprises forming carbon enhanced products.

4. The method of claim 3, wherein the carbon enhanced products comprise metal matrix composites.

5. The method of claim 4, wherein processing the solid carbon to form a recycle feedstock comprises forming solid products comprising one or more of graphite, pyrolytic graphite, graphene, carbon black, fibrous carbon, buckminsterfullerenes, carbon nanotubes, or nanodiamonds.

6. The method of claim 1, wherein recycling at least a portion of the solid carbon to the at least one of the aluminum smelter or the steel smelter comprises combining the at least a portion of the solid carbon with feed materials to the at least one of the aluminum smelter or the steel smelter.

7. The method of claim 1, further comprising passing the intermediate stream through a gas separator and removing at least one of oxygen, nitrogen, or argon from the intermediate stream.

8. The method of claim 7, wherein removing at least one of oxygen, nitrogen, or argon from the intermediate stream comprises producing the dried carbon oxide feedstock gas comprising at least 90% carbon oxides.

9. The method of claim 7, wherein removing at least one of oxygen, nitrogen, or argon from the intermediate stream comprises producing the dried carbon oxide feedstock gas comprising at least 95% carbon oxides.

10. The method of claim 7, wherein removing at least one of oxygen, nitrogen, or argon from the intermediate stream comprises producing the dried carbon oxide feedstock gas comprising at least 98% carbon oxides.

11. The method of claim 1, wherein converting at least a portion of the carbon in the reaction gas mixture to solid carbon comprises converting at least a portion of the carbon in the reaction gas mixture into carbon nanotubes.

12. The method of claim 1, further comprising selecting the at least one reducing gas to comprise an alkane, an alcohol, or a mixture thereof.

* * * * *

UNITED STATES PATENT AND TRADEMARK OFFICE
CERTIFICATE OF CORRECTION

PATENT NO.        : 9,475,699 B2                          Page 1 of 1
APPLICATION NO.   : 14/389720
DATED             : October 25, 2016
INVENTOR(S)       : Dallas B. Noyes It is certified that error appears in the above-identified patent and that said Letters Patent is hereby corrected as shown below:

In the Specification

| | | |
|---|---|---|
| Column 1, | Line 46, | change "Mar. 15, 2013," to --filed Mar. 15, 2013,-- |
| Column 4, | Line 52, | change "MODE(S) FOR CARRYING OUT THE INVENTION" to --DETAILED DESCRIPTION-- |
| Column 18, | Line 46, | change "Electrolytes; " U.S." to --Electrolytes"; U.S.-- |
| Column 18, | Line 48, | change "Delivery; " or" to --Delivery"; or-- |
| Column 19, | Line 16, | change "Therefor; " U.S." to --Therefor"; U.S.-- |
| Column 19, | Line 19, | change "Separation; " and" to --Separation"; and-- |

Signed and Sealed this
Eleventh Day of April, 2017

Michelle K. Lee
*Director of the United States Patent and Trademark Office*